(12) United States Patent
Urano

(10) Patent No.: US 9,742,313 B2
(45) Date of Patent: Aug. 22, 2017

(54) PIEZOELECTRIC MOTOR, ROBOT HAND, ROBOT, FINGER ASSIST APPARATUS, ELECTRONIC COMPONENT CONVEYING APPARATUS, ELECTRONIC COMPONENT INSPECTING APPARATUS, LIQUID FEEDING PUMP, PRINTING APPARATUS, ELECTRONIC TIMEPIECE, AND PROJECTION APPARATUS

(71) Applicant: Seiko Epson Corporation, Tokyo (JP)

(72) Inventor: Osamu Urano, Okaya (JP)

(73) Assignee: Seiko Epson Corporation (JP)

(*) Notice: Subject to any disclaimer, the term of this patent is extended or adjusted under 35 U.S.C. 154(b) by 485 days.

(21) Appl. No.: 14/519,744

(22) Filed: Oct. 21, 2014

(65) Prior Publication Data

US 2015/0114164 A1    Apr. 30, 2015

(30) Foreign Application Priority Data

Oct. 30, 2013  (JP) .................................. 2013-225048

(51) Int. Cl.
*H02N 2/00* (2006.01)
*H02N 2/02* (2006.01)
*H02N 2/10* (2006.01)

(52) U.S. Cl.
CPC ............ *H02N 2/008* (2013.01); *H02N 2/004* (2013.01); *H02N 2/0095* (2013.01); *H02N 2/026* (2013.01); *H02N 2/103* (2013.01); *Y10S 901/23* (2013.01); *Y10T 74/20317* (2015.01)

(58) Field of Classification Search
CPC ...... H02N 2/004; H02N 2/0095; H02N 2/026; H02N 2/103; H02N 2/008
USPC .......................................................... 310/317
See application file for complete search history.

(56) References Cited

U.S. PATENT DOCUMENTS

| | | | |
|---|---|---|---|
| 6,218,769 B1 | 4/2001 | Iino et al. | |
| 7,382,080 B2 | 6/2008 | Lee et al. | |
| 7,459,830 B2 | 12/2008 | Hashimoto | |
| 7,671,510 B2 | 3/2010 | Kawamura et al. | |
| 8,314,531 B2 | 11/2012 | Sunaga et al. | |
| 8,587,181 B2 | 11/2013 | Murakami | |
| 8,604,665 B2 | 12/2013 | Wischnewskij et al. | |

(Continued)

FOREIGN PATENT DOCUMENTS

| | | |
|---|---|---|
| JP | 60-226781 A | 11/1985 |
| JP | 63-136985 A | 6/1988 |

(Continued)

*Primary Examiner* — Thomas Dougherty
(74) *Attorney, Agent, or Firm* — Harness, Dickey & Pierce, P.L.C.

(57) ABSTRACT

A first driving signal is supplied to a first electrode of a vibrating body. A second driving signal is supplied to a second electrode of the vibrating body. A common driving signal is supplied to a common electrode of the vibrating body. A phase of the first driving signal is set changeable with respect to a phase of the common driving signal. A phase of the second driving signal is set changeable with respect to the phase of the common driving signal. Then, it is possible to switch a driving direction of a piezoelectric motor according to which phase of the first driving signal or the second driving signal is varied from the phase of the common driving signal. If the phase is simply changed, a switch is unnecessary. It is possible to reduce a driving circuit in size.

12 Claims, 24 Drawing Sheets

(56) References Cited

U.S. PATENT DOCUMENTS

| | | | |
|---|---|---|---|
| 9,318,980 B2 * | 4/2016 | Urano | H02N 2/103 |
| 2005/0275310 A1 | 12/2005 | Ripoll | |
| 2007/0188048 A1 * | 8/2007 | Nagahama | H01L 41/0906 310/316.01 |
| 2010/0245517 A1 * | 9/2010 | Miyazawa | B41J 23/00 347/104 |
| 2012/0316674 A1 | 12/2012 | Urano | |
| 2012/0316675 A1 | 12/2012 | Urano | |
| 2013/0278110 A1 * | 10/2013 | Miyamoto | H02N 2/004 310/317 |

FOREIGN PATENT DOCUMENTS

| | | | |
|---|---|---|---|
| JP | 02-041679 A | 2/1990 | |
| JP | 06-178557 A | 6/1994 | |
| JP | 06-339286 A | 12/1994 | |
| JP | 09-009650 A | 1/1997 | |
| JP | 09-023667 A | 1/1997 | |
| JP | 2000-116162 A | 4/2000 | |
| JP | 2003-046159 A | 2/2003 | |
| JP | 2005-530473 A | 10/2005 | |
| JP | 2006-238680 A | 9/2006 | |
| JP | 2006-271167 A | 10/2006 | |
| JP | 2007-166776 A | 6/2007 | |
| JP | 2007-221924 A | 8/2007 | |
| JP | 2008-172929 A | 7/2008 | |
| JP | 2009-038886 A | 2/2009 | |
| JP | 2009-505623 A | 2/2009 | |
| JP | 2009-219352 A | 9/2009 | |
| JP | 2010-187538 A | 8/2010 | |
| JP | 2011-087455 A | 4/2011 | |
| JP | 2012-055102 A | 3/2012 | |
| JP | 2012-253989 A | 12/2012 | |
| JP | 2012-257424 A | 12/2012 | |

* cited by examiner

HOLDING

NORMAL ROTATION

REVERSE ROTATION

IDLING

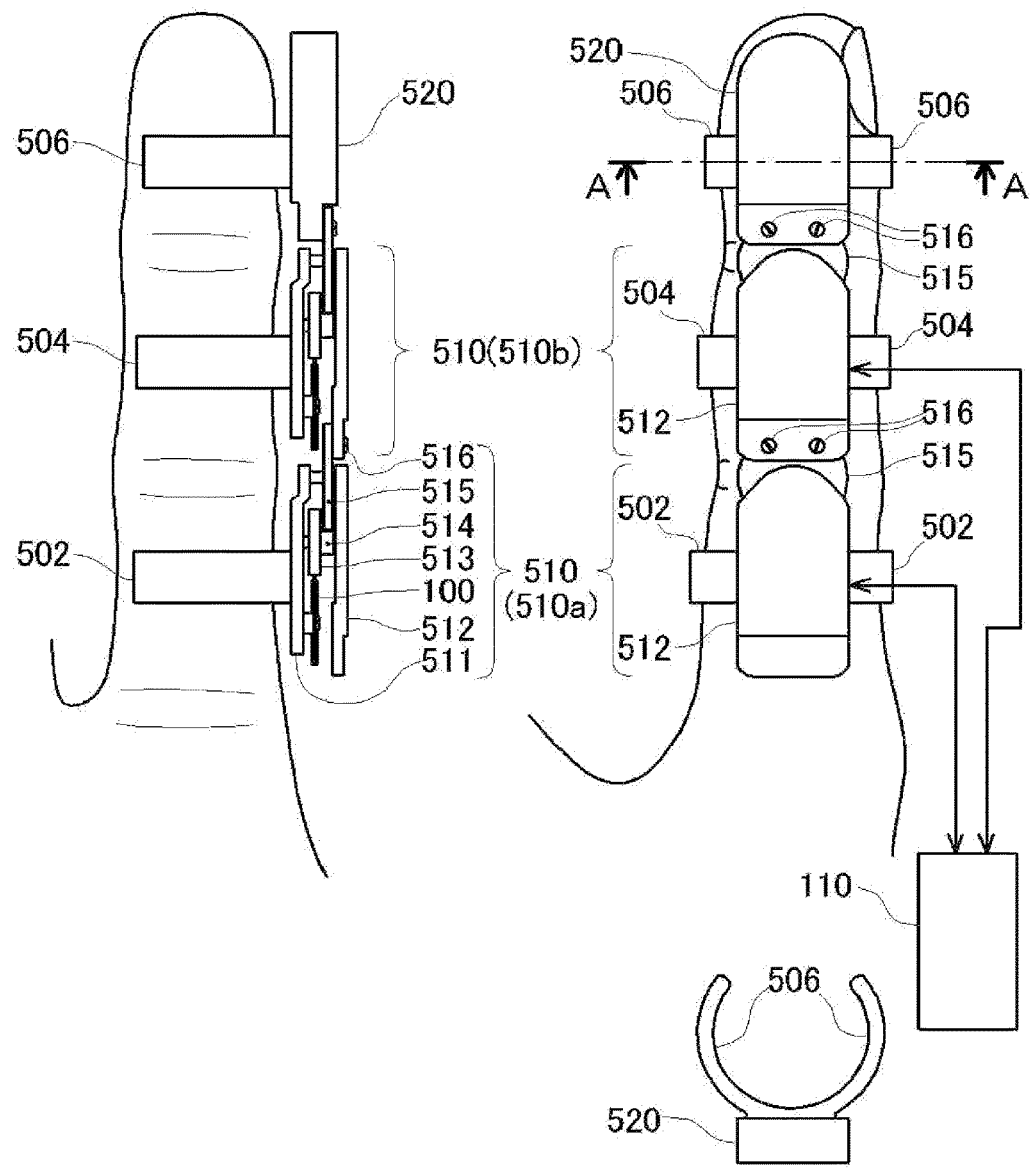

PIEZOELECTRIC MOTOR, ROBOT HAND, ROBOT, FINGER ASSIST APPARATUS, ELECTRONIC COMPONENT CONVEYING APPARATUS, ELECTRONIC COMPONENT INSPECTING APPARATUS, LIQUID FEEDING PUMP, PRINTING APPARATUS, ELECTRONIC TIMEPIECE, AND PROJECTION APPARATUS

BACKGROUND

1. Technical Field

The present invention relates to a piezoelectric motor, a robot hand, a robot, a finger assist apparatus, an electronic component conveying apparatus, an electronic component inspecting apparatus, a liquid feeding pump, a printing apparatus, an electronic timepiece, and a projection apparatus.

2. Related Art

There is known a piezoelectric motor that vibrates a vibrating body including a piezoelectric material and drives a target object. The piezoelectric motor applies a fixed-cycle driving voltage to the vibrating body to thereby vibrate the vibrating body and drives a body to be driven with a projection provided on an end face of the vibrating body.

In the piezoelectric motor, there is also proposed a technique for forming four-divided electrodes on the surface of the vibrating body and switching an electrode applied with the driving voltage to thereby making it possible to switch a driving direction of the body to be driven (JP-A-2000-116162 (Patent Literature 1)).

However, in the proposed technique, since a switch needs to be used to switch the electrode applied with the driving voltage, first, a large current needs to be fed to drive the vibrating body. Therefore, a switch capable of switching the large current is necessary. The switch is increased in size or the piezoelectric motor including a circuit portion for switching an electric current is increased in size. Even when a switching element such as a power transistor is used, since the switching element capable of withstanding the large current cannot operate at high speed, at an instance of the switching, there is an instance when the driving voltage is not applied to all the electrodes. Therefore, the piezoelectric motor becomes uncontrollable at an instance when the driving direction is switched. It is difficult to perform delicate control.

SUMMARY

An advantage of some aspects of the invention is to provide a technique not requiring a large switch and capable of reducing a piezoelectric motor including a circuit portion in size and performing delicate control of the piezoelectric motor.

A piezoelectric motor according to an aspect of the invention adopts the following configuration. That is, the piezoelectric motor according to the aspect of the invention includes: a vibrating body including a piezoelectric material; a common electrode arranged on one surface of the vibrating body; a first electrode and a second electrode arranged on a surface different from the surface on which the common electrode is arranged; and a driving-signal supplying section configured to supply a common driving signal to the common electrode, supply a first driving signal to the first electrode, and supply a second driving signal to the second electrode. The driving-signal supplying section is capable of supplying the first driving signal with a phase varied from a phase of the common driving signal and supplying the second driving signal with a phase varied from the phase of the common driving signal.

In the piezoelectric motor according to the aspect of the invention, if there is a voltage difference between the first driving signal supplied to the first electrode and the common driving signal supplied to the common electrode, it is possible to vibrate the vibrating body with the voltage difference. Similarly, if there is a voltage difference between the second driving signal supplied to the second electrode and the common driving signal supplied to the common electrode, it is possible to vibrate the vibrating body with the voltage difference. The driving-signal supplying section can supply the first driving signal with the phase varied from the phase of the common driving signal and supply the second driving signal with the phase varied from the phase of the common driving signal. Therefore, it the phase of the first driving signal is varied from the phase of the common driving signal, it is possible to drive the piezoelectric motor with the voltage difference applied to the first electrode and the common electrode. If the phase of the second driving signal is varied from the phase of the common electrode, it is possible to drive the piezoelectric motor with the voltage difference applied to the second electrode and the common electrode. As a result, it is possible to switch a driving direction of the piezoelectric motor simply by changing the phase of the first driving signal or the second driving signal. Therefore, a switch is unnecessary. It is possible to reduce the piezoelectric motor including a circuit portion in size. In addition, if the phase of the first driving signal or the second driving signal is changed with respect to the phase of the common driving signal, the phase can be practically instantaneously changed. Therefore, the piezoelectric motor does not become uncontrollable at an instance when the driving direction is switched. As a result, it is also possible to perform delicate control using the piezoelectric motor.

In the piezoelectric motor according to the aspect of the invention described above, the first electrode and the second electrode may be arranged on a surface on the opposite side of the surface on which the common electrode is arranged.

With this configuration, the surface on which the common electrode is arranged and the surface on which the first electrode and the second electrode are arranged sandwich the vibrating body. Therefore, since an electric field in a direction traversing the vibrating body is generated when a driving signal is supplied, a voltage applied to the vibrating body does not deviate. As a result, it is possible to efficiently vibrate the vibrating body.

In the piezoelectric motor according to the aspect of the invention described above, the first driving signal, the second driving signal, and the common driving signal may be signals having the same waveform.

With this configuration, by setting the phases of the first driving signal and the common driving signal the same, it is possible not to practically apply a voltage to the first electrode and the common electrode. Similarly, by setting the phases of the second driving signal and the common driving signal the same, it is possible not to practically apply a voltage to the second electrode and the common electrode. Therefore, by setting the phase of the first driving signal different from the phase of the common driving signal and setting the phase of the second driving signal the same as the phase of the common driving signal, it is possible to realize a state in which the piezoelectric motor is driven in a normal rotation direction. By setting the phase of the first driving signal the same as the phase of the common driving signal and setting the phase of the second driving signal different from the phase of the common driving signal, it is possible to realize a state in which the piezoelectric motor is driven in a reverse rotation direction.

In the piezoelectric motor according to the aspect of the invention described above, the first driving signal, the second driving signal, and the common driving signal may be able to be supplied in the same phase.

With this configuration, by setting the phases of the first driving signal and the second driving signal the same as the phase of the common driving signal, it is possible to realize a state in which the piezoelectric motor is not driven.

In the piezoelectric motor according to the aspect of the invention described above, a first low-pass filter circuit may be connected to the first electrode and a second low-pass filter circuit may be connected to the second electrode.

With this configuration, the first driving signal, the second driving signal, and the common driving signal can be pulse-like driving signals alternately switched to a high voltage state and a low voltage state. The pulse-like driving signals can be simply voltage-amplified. Therefore, it is possible to reduce the circuit portion for driving the piezoelectric motor in size.

In the piezoelectric motor according to the aspect of the invention described above, the first driving signal and the second driving signal having phases different from the phase of the common driving signal but having the same phase each other may be able to be supplied.

With this configuration, it is possible to apply a voltage between the first electrode and the common electrode and between the second electrode and the common electrode. Therefore, a force for driving the piezoelectric motor in a normal rotation direction and a force for driving the piezoelectric motor in a reverse rotation direction cancel each other. It is possible to realize a state in which the vibrating body is vibrating but does not transfer a driving force to the body to be driven (an idling state of the piezoelectric motor).

In the piezoelectric motor according to the aspect of the invention described above, the phase of the first driving signal may be able to be changed with respect to the phase of the common driving signal and the phase of the second driving signal may be able to be changed with respect to the phase of the common driving signal. When the phase is changed, the phase may be continuously changed or may be switched in a plurality of stages.

With this configuration, it is possible to change voltages applied to the first electrode and the common electrode and voltages applied to the second electrode and the common electrode. Therefore, it is possible to more finely control an operation state of the piezoelectric motor.

In the piezoelectric motor according to the aspect of the invention described above, in addition to the first electrode and the second electrode, a third electrode may be provided on a surface on the opposite side of the surface on which the common electrode is arranged. A third driving signal having a phase different from the phase of the common driving signal may be able to be supplied to the third electrode.

With this configuration, by varying the phase of the third driving signal from the phase of the common driving signal, it is possible to apply a voltage between the third electrode and the common electrode as well. Therefore, it is possible to cause the piezoelectric motor to operate under more appropriate conditions.

In the piezoelectric motor according to the aspect of the invention described above, a turning body may be driven as the body to be driven.

With this configuration, it is possible to apply the piezoelectric motor as power sources for various bodies to be driven that are driven to rotate.

In the piezoelectric motor according to the aspect of the invention described above, a linearly moving body may be driven as the body to be driven.

With this configuration, it is possible to apply the piezoelectric motor as power sources for various bodies to be driven that are driven to translate.

The invention can be grasped as a robot hand having the following configuration. That is, another aspect of the invention can be grasped as a robot hand including a plurality of finger sections and gripping a target object. The robot hand includes: a base on which the finger sections are movably erected; and a piezoelectric motor configured to move the finger sections with respect to the base. The piezoelectric motor includes: a vibrating body including a piezoelectric material; a common electrode arranged on one surface of the vibrating body; a first electrode and a second electrode arranged on a surface different from the surface on which the common electrode is arranged; and a driving-signal supplying section configured to supply a common driving signal to the common electrode, supply a first driving signal to the first electrode, and supply a second driving signal to the second electrode. The driving-signal supplying section is capable of supplying the first driving signal with a phase varied from a phase of the common driving signal and supplying the second driving signal with a phase varied from the phase of the common driving signal.

According to the aspect of the invention described above, since the piezoelectric motor can be reduced in size, the robot hand can be reduced in size. Further, it is possible to realize the robot hand capable of controlling a fine operation.

The invention can be grasped as a robot having the following configuration. That is, still another aspect of the invention can be grasped as a robot including: an arm section provided with a turnable joint section; a hand section provided in the arm section; and a main body section provided with the arm section. The robot includes a piezoelectric motor provided in the joint section and configured to bend or drive to rotate the joint section. The piezoelectric motor includes: a vibrating body including a piezoelectric material; a common electrode arranged on one surface of the vibrating body; a first electrode and a second electrode arranged on a surface different from the surface on which the common electrode is arranged; and a driving-signal supplying section configured to supply a common driving signal to the common electrode, supply a first driving signal to the first electrode, and supply a second driving signal to the second electrode. The driving-signal supplying section is capable of supplying the first driving signal with a phase varied from a phase of the common driving signal and supplying the second driving signal with a phase varied from the phase of the common driving signal.

According to the aspect of the invention described above, since the piezoelectric motor can be reduced in size, the robot can be reduced in size. Further, it is possible to realize the robot capable of controlling a fine operation.

The invention can be grasped as a finger assist apparatus having the following configuration. That is, yet another aspect of the invention can be grasped as a finger assist apparatus worn on a finger and coupled with a plurality of units rotatable in a bending direction of the finger to assist a bending motion of the finger. The unit includes: a first member arranged along the finger; a second member arranged to be opposed to the first member; a coupling member arranged between the first member and the second member to couple the unit to the unit adjacent thereto, the coupling member coupling the unit and the adjacent unit in a form rotatable in a direction in which the finger bends; and a piezoelectric motor arranged between the first member and the second member and configured to rotate the coupling member. The piezoelectric motor includes: a vibrating body including a piezoelectric material; a common electrode arranged on one surface of the vibrating body; a first electrode and a second electrode arranged on a surface different from the surface on which the common electrode is arranged; and a driving-signal supplying section configured to supply a common driving signal to the common electrode, supply a first driving signal to the first electrode, and supply a second driving signal to the second electrode. The driving-signal supplying section is capable of supplying the first driving signal with a phase varied from a phase of the common driving signal and supplying the second driving signal with a phase varied from the phase of the common driving signal.

According to the aspect of the invention described above, since the piezoelectric motor can be reduced in size, the finger assist apparatus can be reduced in size. Further, it is possible to realize the finger assist apparatus capable of controlling a fine operation.

The invention can be grasped as an electronic component conveying apparatus having the following configuration. That is, still yet another aspect of the invention can be grasped as an electronic component conveying apparatus including: a gripping section configured to grip an electronic component; and a piezoelectric motor configured to drive the gripping section that is gripping the electronic component. The piezoelectric motor includes: a vibrating body including a piezoelectric material; a common electrode arranged on one surface of the vibrating body; a first electrode and a second electrode arranged on a surface different from the surface on which the common electrode is arranged; and a driving-signal supplying section configured to supply a common driving signal to the common electrode, supply a first driving signal to the first electrode, and supply a second driving signal to the second electrode. The driving-signal supplying section is capable of supplying the first driving signal with a phase varied from a phase of the common driving signal and supplying the second driving signal with a phase varied from the phase of the common driving signal.

According to the aspect of the invention described above, since the piezoelectric motor can be reduced in size, the electronic component conveying apparatus can be reduced in size. Further, it is possible to realize the electronic component conveying apparatus capable of controlling a fine operation.

The invention can be grasped as an electronic component inspecting apparatus having the following configuration. That is, further another aspect of the invention can be grasped as an electronic component inspecting apparatus including: a gripping section configured to grip an electronic component; a piezoelectric motor configured to drive the gripping section that is gripping the electronic component; and an inspecting section configured to inspect the electronic component. The piezoelectric motor includes: a vibrating body including a piezoelectric material; a common electrode arranged on one surface of the vibrating body; a first electrode and a second electrode arranged on a surface different from the surface on which the common electrode is arranged; and a driving-signal supplying section configured to supply a common driving signal to the common electrode, supply a first driving signal to the first electrode, and supply a second driving signal to the second electrode. The driving-signal supplying section is capable of supplying the first driving signal with a phase varied from a phase of the common driving signal and supplying the second driving signal with a phase varied from the phase of the common driving signal.

According to the aspect of the invention described above, since the piezoelectric motor can be reduced in size, the electronic component inspecting apparatus can be reduced in size. Further, it is possible to realize the electronic component inspecting apparatus capable of controlling a fine operation.

The invention can be grasped as a liquid feeding pump having the following configuration. That is, still further another aspect of the invention can be grasped as a liquid feeding pump including: a liquid tube through which liquid can flow; a closing section configured to come into contact with a part of the liquid tube and close the liquid tube; a moving section configured to move in a holding state of the closing section to thereby move a closing position of the liquid tube; and a piezoelectric motor configured to drive the moving section. The piezoelectric motor includes: a vibrating body including a piezoelectric material; a common electrode arranged on one surface of the vibrating body; a first electrode and a second electrode arranged on a surface different from the surface on which the common electrode is arranged; and a driving-signal supplying section configured to supply a common driving signal to the common electrode, supply a first driving signal to the first electrode, and supply a second driving signal to the second electrode. The driving-signal supplying section is capable of supplying the first driving signal with a phase varied from a phase of the common driving signal and supplying the second driving signal with a phase varied from the phase of the common driving signal.

According to the aspect of the invention described above, since the piezoelectric motor can be reduced in size, the liquid feeding pump can be reduced in size. Further, it is possible to realize the liquid feeding pump capable of controlling a fine operation.

The invention can be grasped as a printing apparatus having the following configuration. That is, yet further another aspect of the invention can be grasped as a printing apparatus including a print head configured to print an image on a medium; and a piezoelectric motor configured to move the print head. The piezoelectric motor includes: a vibrating body including a piezoelectric material; a common electrode arranged on one surface of the vibrating body; a first electrode and a second electrode arranged on a surface different from the surface on which the common electrode is arranged; and a driving-signal supplying section configured to supply a common driving signal to the common electrode, supply a first driving signal to the first electrode, and supply a second driving signal to the second electrode. The driving-signal supplying section is capable of supplying the first driving signal with a phase varied from a phase of the common driving signal and supplying the second driving signal with a phase varied from the phase of the common driving signal.

According to the aspect of the invention described above, since the piezoelectric motor can be reduced in size, the printing apparatus can be reduced in size. Further, since a fine operation can be controlled, it is possible to realize the printing apparatus capable of printing a high-quality image.

The invention can be grasped as an electronic timepiece having the following configuration. That is, still yet further another aspect of the invention can be grasped as an electronic timepiece including: a rotating disk coaxially provided with a gear and capable of turning; a gear train including a plurality of gears; a pointer connected to the gear train and configured to point time; and a piezoelectric motor configured to drive the rotating disk. The piezoelectric motor includes: a vibrating body including a piezoelectric material; a common electrode arranged on one surface of the vibrating body; a first electrode and a second electrode arranged on a surface different from the surface on which the common electrode is arranged; and a driving-signal supplying section configured to supply a common driving signal to the common electrode, supply a first driving signal to the first electrode, and supply a second driving signal to the second electrode. The driving-signal supplying section is capable of supplying the first driving signal with a phase varied from a phase of the common driving signal and supplying the second driving signal with a phase varied from the phase of the common driving signal.

According to the aspect of the invention described above, since the piezoelectric motor can be reduced in size, the electronic timepiece can be reduced in size. Further, since a fine operation can be controlled, it is possible to realize the highly accurate electronic timepiece.

The invention can be grasped as a projection apparatus having the following configuration. That is, a further aspect of the invention can be grasped as a projection apparatus including: a projecting section including an optical lens and configured to project light from a light source; an adjusting section configured to adjust a projection state of the light by the optical lens; and a piezoelectric motor configured to drive the adjusting section. The piezoelectric motor includes: a vibrating body including a piezoelectric material; a common electrode arranged on one surface of the vibrating body; a first electrode and a second electrode arranged on a surface different from the surface on which the common electrode is arranged; and a driving-signal supplying section configured to supply a common driving signal to the common electrode, supply a first driving signal to the first electrode, and supply a second driving signal to the second electrode. The driving-signal supplying section is capable of supplying the first driving signal with a phase varied from a phase of the common driving signal and supplying the second driving signal with a phase varied from the phase of the common driving signal.

According to the aspect of the invention described above, since the piezoelectric motor can be reduced in size, the projection apparatus can be reduced in size. Further, since a fine operation can be controlled, it is possible to realize the projection apparatus capable of accurately positioning the adjusting section and finely adjusting the projection state.

The invention can be grasped as a piezoelectric motor having the following configuration. That is, a still further aspect of the invention can be grasped as a piezoelectric motor including a vibrating body provided with a common electrode, a first electrode, and a second electrode and configured to perform bending vibration. The piezoelectric motor is capable of supplying a driving signal having a phase different from a phase of the common electrode to the first electrode and supplying a driving signal having a phase different from the phase of the common electrode to the second electrode.

In the piezoelectric motor according to the aspect of the invention described above, since the driving signal having the phase different from the phase of the common electrode is supplied to the first electrode, it is possible to apply a voltage between the first electrode and the common electrode. Similarly, since the driving signal having the phase different from the phase of the common electrode is supplied to the second electrode, it is possible to apply a voltage between the second electrode and the common electrode. Therefore, since a driving direction of the piezoelectric motor can be switched by changing a phase of a driving signal applied to the first electrode or the second electrode, a switch is unnecessary. It is possible to reduce the piezoelectric motor including a circuit portion in size. In addition, the piezoelectric motor does not become uncontrollable at an instance when the driving direction is switched. As a result, it is also possible to perform delicate control using the piezoelectric motor.

The invention can be grasped as a piezoelectric motor having the following configuration. That is, a yet further aspect of the invention can be grasped as a piezoelectric motor including a vibrating body provided with a common electrode, a first electrode, and a second electrode and configured to perform bending vibration. The piezoelectric motor is capable of supplying a driving signal having a phase same as a phase of the common electrode to at least one of the first electrode and the second electrode.

Consequently, it is possible to easily switch a state in which the piezoelectric motor is not driven, a state in which the piezoelectric motor is driven in a normal rotation direction, and a state in which the piezoelectric motor is driven in a reverse rotation direction.

The invention can be grasped as a piezoelectric motor having the following configuration. That is, a still yet further aspect of the invention can be grasped as a piezoelectric motor including a vibrating body provided with a common electrode, a first electrode, and a second electrode and configured to perform bending vibration. The piezoelectric motor is capable of supplying a driving signal having a phase different from a phase of the common electrode to at least one of the first electrode and the second electrode.

Consequently, it is possible to easily switch a state in which the piezoelectric motor is driven but a driving force is not generated, a state in which the piezoelectric motor is driven in a normal rotation direction, and a state in which the piezoelectric motor is driven in a reverse rotation direction.

The invention can be grasped as a piezoelectric motor having the following configuration. That is, a furthermore aspect of the invention can be grasped as a piezoelectric motor including: a vibrating body including a piezoelectric material; a common electrode arranged on one surface of the vibrating body; a first electrode and a second electrode arranged on a surface different from the surface on which the common electrode is arranged; and a driving-signal supplying section configured to supply a common driving signal to the common electrode, supply a first driving signal to the first electrode, and supply a second driving signal to the second electrode. A phase of the first driving signal is different from a phase of the common driving signal. A phase of the second driving signal is different from the phase of the common driving signal.

Consequently, it is possible to switch a driving direction of the piezoelectric motor according to which of the first driving signal and the second riving signal is supplied. Therefore, a switch is unnecessary. It is possible to reduce the piezoelectric motor including a circuit portion in size. In addition, if a driving signal to be supplied is only switched, the driving signal can be practically instantaneously switched. Therefore, the piezoelectric motor does not become uncontrollable at an instance when the driving direction is switched. As a result, it is also possible to perform delicate control using the piezoelectric motor.

In the piezoelectric motor according to the aspect of the invention described above, a waveform of the first driving signal and a waveform of the second driving signal may be the same as a waveform of the common driving signal.

Consequently, by varying the phase of the first driving signal or the second driving signal from the phase of the common driving signal, since a voltage is applied to the first electrode or the second electrode, it is possible to drive the piezoelectric motor.

The invention can be grasped as a piezoelectric motor having the following configuration. That is, a still furthermore aspect of the invention can be grasped as a piezoelectric motor including: a vibrating body including a piezoelectric material; a common electrode arranged on one surface of the vibrating body; a first electrode and a second electrode arranged on a surface different from the surface on which the common electrode is arranged; and a driving-signal supplying section configured to supply a common driving signal to the common electrode, supply a first driving signal to the first electrode, and supply a second driving signal to the second electrode. A phase of the first driving signal and a phase of the second driving signal is the same as a phase of the common driving signal.

Consequently, it is possible to realize a state in which the piezoelectric motor is not driven while the first driving signal, the second driving signal, and the common driving signal are kept supplied. Therefore, every time the driving of the piezoelectric motor is stopped or a driving direction is reversed, it is unnecessary to change over a switch. Therefore, it is possible to reduce the piezoelectric motor including a circuit portion in size.

BRIEF DESCRIPTION OF THE DRAWINGS

The invention will be described with reference to the accompanying drawings, wherein like numbers reference like elements.

FIGS. 21A to 21C are explanatory diagrams showing a finger assist apparatus incorporating the piezoelectric motor in this embodiment.

DESCRIPTION OF EXEMPLARY EMBODIMENTS

A. First Embodiment

A-1. Device Configuration

Figure 1:
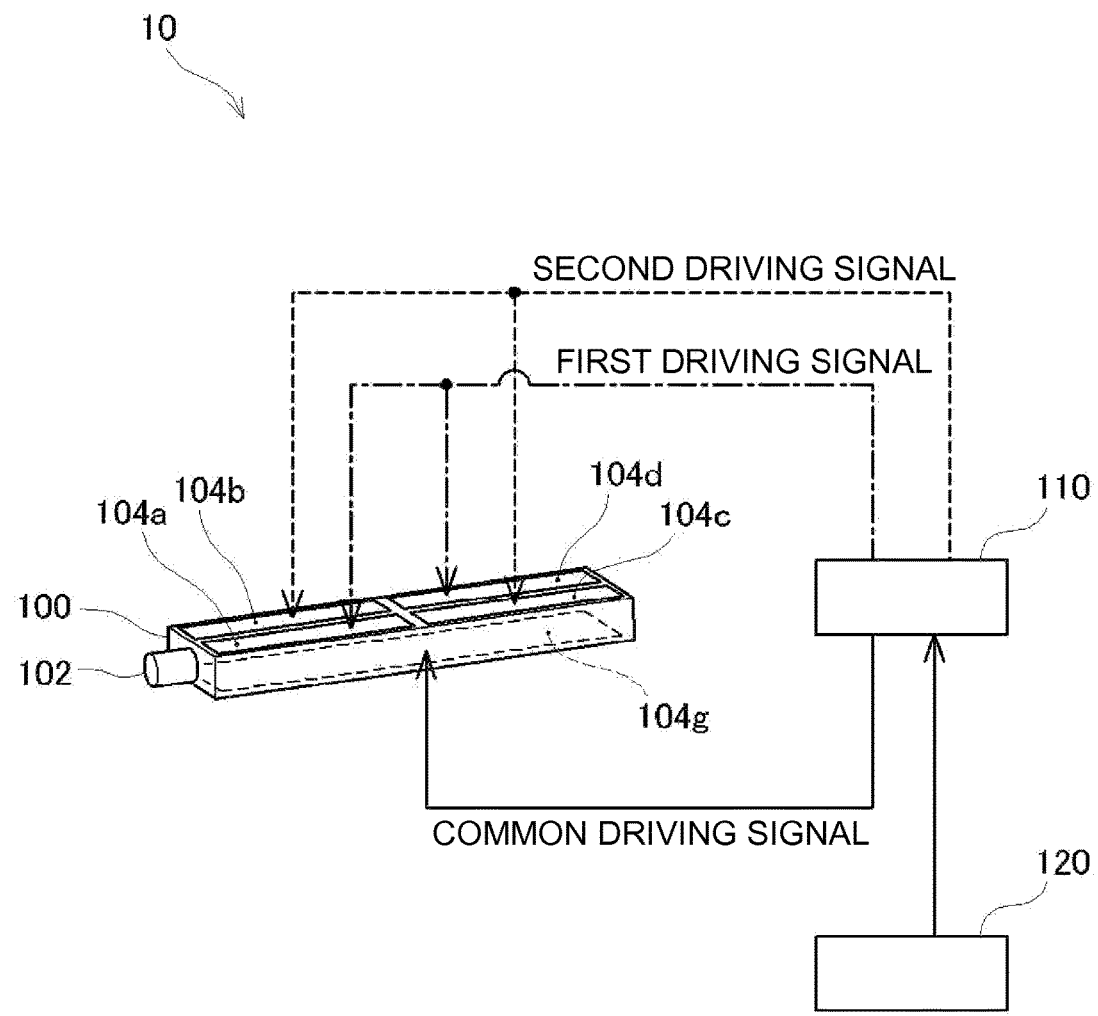
FIG. 1 is an explanatory diagram showing the rough configuration of a piezoelectric motor in a first embodiment.

FIG. 1 is an explanatory diagram showing the rough configuration of a piezoelectric motor 10 in a first embodiment. The piezoelectric motor 10 includes a vibrating body 100 mainly formed of a piezoelectric material such as PZT and a driving-signal supplying section 110 that supplies a driving signal for driving the vibrating body 100. The driving signal supplying section 110 is controlled by a control section 120 incorporating a CPU or the like.

The vibrating body 100 shown in the figure is formed in a substantially rectangular shape in a cross section and in a shape having a longitudinal direction (e.g., a rectangular parallelepiped shape). A projection 102 made of ceramics is attached to an end face in the longitudinal direction. On one side surface, four electrodes 104a to 104d are provided to divide the side surface into four in a lattice shape. Among the electrodes, the electrode 104a and the electrode 104d are first electrodes and the electrode 104b and the electrode 104c are second electrodes. On a side surface on the opposite side of the side surface on which the four electrodes 104a to 104d are provided, an electrode 104g is provided over substantially the entire side surface. The electrode 104g is a common electrode. A first driving signal is supplied to the electrode 104a and the electrode 104d (the first electrodes) from the driving-signal supplying section 110. A second driving signal is supplied to the electrode 104b and 104c (the second electrodes) from the driving-signal supplying section 110. A common driving signal is supplied to the electrode 104g (the common electrode) from the driving-signal supplying section 110. Consequently, it is possible to cause the piezoelectric motor 10 to operate in a normal rotation direction or a reverse rotation direction.

A basic operation of the vibrating body 100 is explained as preparation for explaining the internal configuration of the driving-signal supplying section 110 and a reason why the first driving signal, the second driving signal, and the common driving signal are supplied to the vibrating body 100 to cause the piezoelectric motor 10 operate.

Figure 2A:
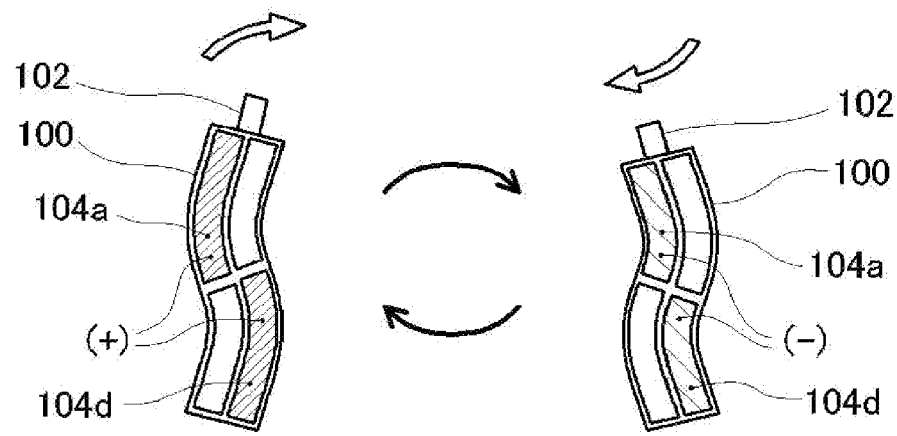
FIGS. 2A and 2B are explanatory diagrams showing a basic operation of a vibrating body.
Figure 2B:
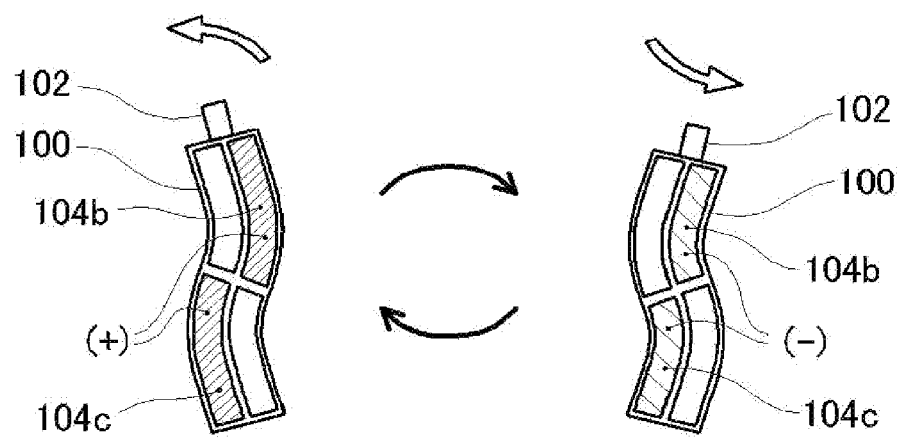

FIGS. 2A and 2B are explanatory diagrams showing the basic operation of the vibrating body 100. As explained above, in the vibrating body 100, the first electrodes (the electrode 104a and the electrode 104d), the second electrodes (the electrode 104b and the electrode 104c), and the common electrode (the electrode 104g) are provided. As it is well known, the piezoelectric material has a characteristic that the piezoelectric material expands when a positive voltage is applied thereto and contracts when a negative voltage is applied thereto.

Therefore, when the positive and negative voltages are alternately applied to the first electrodes (the electrode 104a and the electrode 104d), for example, in a state in which the common electrode (the electrode 104g) are grounded, a portion applied with the voltages repeats expansion and contraction. As a result, as shown in FIG. 2A, bending vibration of the vibrating body 100 occurs. Since the positive and negative voltages are alternately applied, longitudinal vibration also occurs in which the entire vibrating body 100 alternately repeats expansion and contraction. Therefore, the projection 102 attached to the distal end of the vibrating body 100 vibrates to draw a clockwise elliptical track on the drawing. In this embodiment, the vibration in this direction (the clockwise direction on the drawing) is referred to as normal rotation direction.

When the positive and negative voltages are alternately applied to the second electrodes (the electrode 104b and the electrode 104c) in the state in which the common electrode (the electrode 104g) is grounded, as shown in FIG. 2B, the projection 102 attached to the distal end of the vibrating body 100 vibrates to draw a counterclockwise elliptical track on the drawing. In this embodiment, the vibration in this direction (the counterclockwise direction on the drawing) is referred to as reverse rotation direction.

In this way, the vibrating body 100 vibrates in the normal rotation direction when the positive and negative voltages are alternately applied to the first electrodes (the electrode 104a and the electrode 104d) and vibrates in the reverse rotation direction when the positive and negative voltages are alternately applied to the second electrodes (the electrode 104b and the electrode 104c). Therefore, if the projection 102 of the vibrating body 100 is pressed against a not-shown body to be driven using an elastic member such as a spring, it is possible to drive the body to be driven in the normal direction or the reverse direction. On the basis of the above, the internal configuration of the driving-signal supplying section 110 that supplies the first driving signal, the second driving signal, and the common driving signal to the vibrating body 100 and a driving principle of the piezoelectric motor 10 in the first embodiment are explained.

Figure 3:
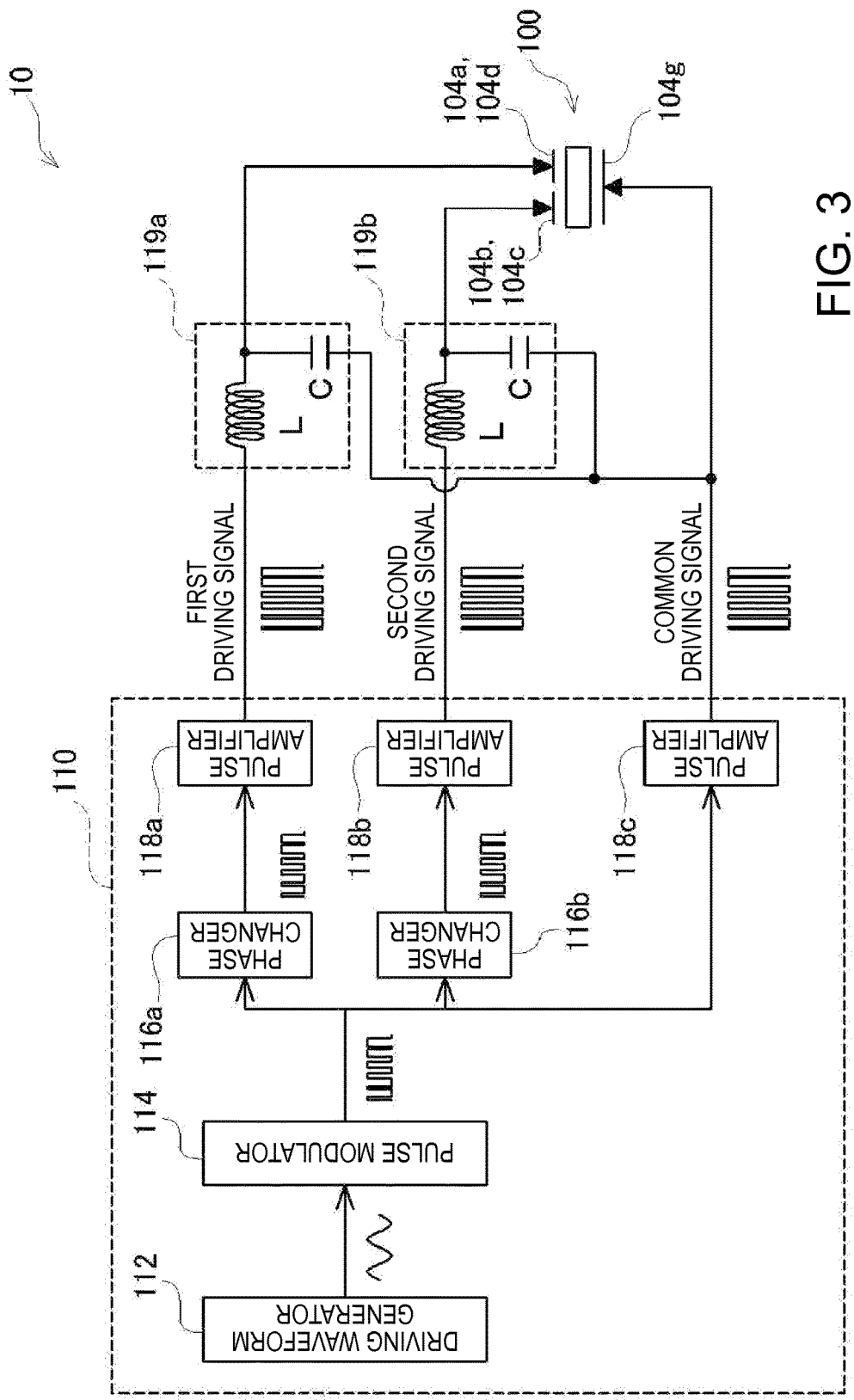
FIG. 3 is a block diagram showing the internal configuration of a driving-signal supplying section.

FIG. 3 is a block diagram showing the internal configuration of the driving-signal supplying section 110. As shown in the figure, the driving-signal supplying section 110 includes a driving waveform generator 112, a pulse modulator 114, two phase changers 116a and 116b, and three pulse amplifiers 118a, 118b, and 118c. The driving waveform generator 112 incorporates a DA converter and generates a cyclic voltage waveform (e.g., a sine wave) applied to the vibrating body 110. The pulse modulator 114 subjects the voltage waveform generated by the driving waveform generator 112 to pulse width modulation to thereby generate a pulse signal.

The pulse signal generated in this way is divided into three equal pulse signals. One pulse signal among the three pulse signals is supplied to the pulse amplifier 118a via the phase changer 116a. Another pulse signal is supplied to the pulse amplifier 118b via the phase changer 116b. The remaining one pulse signal is directly supplied to the pulse amplifier 118c. Therefore, a phase of the pulse signal supplied to the pulse amplifier 118a can be delayed (or advanced) with respect to a phase of the pulse signal supplied to the pulse amplifier 118c by the phase changer 116a. Similarly, a phase of the pulse signal supplied to the pulse amplifier 118b can be delayed (or advanced) with respect to the phase of the pulse signal supplied to the pulse amplifier 118c by the phase changer 116b. The pulse amplifiers 118a, 118b, and 118c amplify the voltages of the pulse signals, the phases of which are changed in this way, to thereby generate driving signals.

Figure 4:
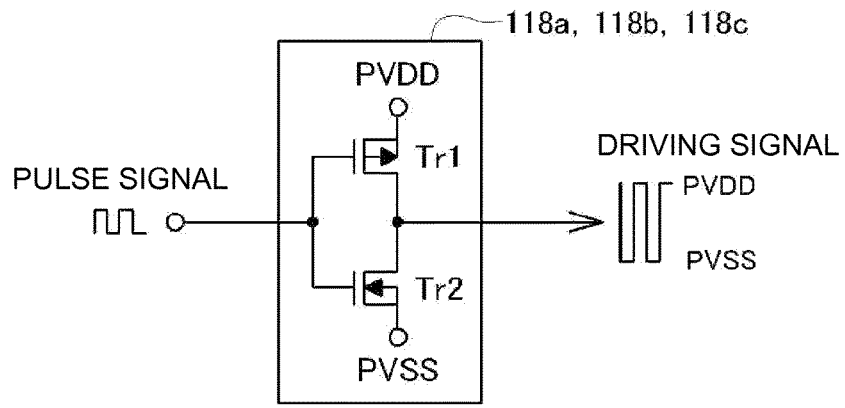
FIG. 4 is an explanatory diagram showing the internal structure of pulse amplifiers.

FIG. 4 is an explanatory diagram showing the internal structure of the pulse amplifiers 118a, 118b, and 118c. As shown in the figure, the pulse amplifiers 118a, 118b, and 118c each include two transistors Tr1 and Tr2. The transistors Tr1 and Tr2 are connected in series. The transistor Tr1 on an upper stage side is connected to a power supply voltage PVDD on a high voltage side. The transistor Tr2 on a lower stage side is connected to a power supply voltage PVSS on a low voltage side. Further, pulse signals are input to gate terminals of the respective transistors Tr1 and Tr2. A voltage between the transistor Tr1 and the transistor Tr2 connected in series is output to the outside from the pulse amplifiers 118, 118b, and 118c.

The pulse amplifiers 118a, 118b, and 118c voltage-amplify a pulse signal as explained below. For example, it is assumed that the pulse signal changes to a High state. In this case, the transistor Tr1 changes to OFF and the transistor Tr2 changes to ON. Therefore, an output voltage of the pulse amplifiers 118a, 118b, and 118c changes to the power supply voltage PVSS on the low voltage side. Conversely, it is assumed that the pulse signal changes to a Low state. In this case, the transistor Tr1 changes to ON and the transistor Tr2 changes to OFF. Therefore, the output voltage of the pulse amplifiers 118a, 118b, and 118c changes to the power supply voltage PVDD on the high voltage side. Therefore, when the pulse signal, which repeats the High state and the Low state, is input, a pulse-like voltage waveform, which repeats the power supply voltage PVSS on the low voltage side and the power supply voltage PVDD on the high voltage side, is output from the pulse amplifiers 118a, 118b, and 118c. Note that the output voltage of the pulse amplifiers 118a, 118b, and 118c only has to be switched between the power supply voltage PVDD and the power supply voltage PVSS according to the switching of the pulse signal between the High state and the Low state. Therefore, the pulse amplifiers 118a, 118b, and 118c are not limited to the configuration including the transistors Tr1 and Tr2 as shown in FIG. 4. The pulse amplifiers 118a, 118b, and 118c may be configured by different circuit configurations.

As shown in FIG. 3, the pulse amplifier 118a voltage-amplifies the pulse signal received from the phase changer 116a and outputs the pulse signal as a first driving signal. The pulse amplifier 118b voltage-amplifies the pulse signal received from the phase changer 116b and outputs the pulse signal as a second driving signal. Further, the pulse amplifier 118c voltage-amplifies the pulse signal from the pulse modulator 114 and outputs the pulse signal as a common driving signal. The phase changer 116a can change a phase of the pulse signal received from the pulse modulator 114. Therefore, when the phase changer 116a delays (or advances) the phase of the pulse signal, a phase of the first driving signal can also be delayed (or advanced) with respect to a phase of the common driving signal. Similarly, when the phase changer 116b delays (or advances) a phase of the pulse signal, a phase of the second driving signal can also be delayed (or advanced) with respect to the phase of the common driving signal.

The first driving signal generated as explained above is supplied to the first electrodes (the electrode 104a and the electrode 104d) of the vibrating body 100 via a first low-pass filter circuit 119a. Similarly, the second driving signal is supplied to the second electrodes (the electrodes 104b and the electrode 104c) of the vibrating body 100 via a second low-pass filter circuit 119b. The first low-pass filter circuit 119a and the second low-pass filter circuit 119b in this embodiment are formed by induction components such as a coil L and capacitive components such as the capacitor C. The common driving signal is directly supplied to the common electrode (the electrode 104g) of the vibrating body 100.

A-2. Driving Principle of the Piezoelectric Motor

As explained above, the first driving signal output from the driving-signal supplying section 110 is supplied to the first electrodes (the electrode 104a and the electrode 104d) of the vibrating body 110, the second driving signal is supplied to the second electrodes (the electrode 104b and the electrode 104c), and the common driving signal is supplied to the common electrode (the electrode 104g). The driving-signal supplying section 110 is capable of outputting the first driving signal with a phase varied from a phase of the common driving signal and capable of outputting the second driving signal with a phase varied from the phase of the common driving signal. In the first embodiment, by changing the phase of the first driving signal or the second driving signal with respect to the phase of the common driving signal, it is possible to drive the piezoelectric motor 10 in the normal direction or the reverse direction or stop the driving.

Figure 5:
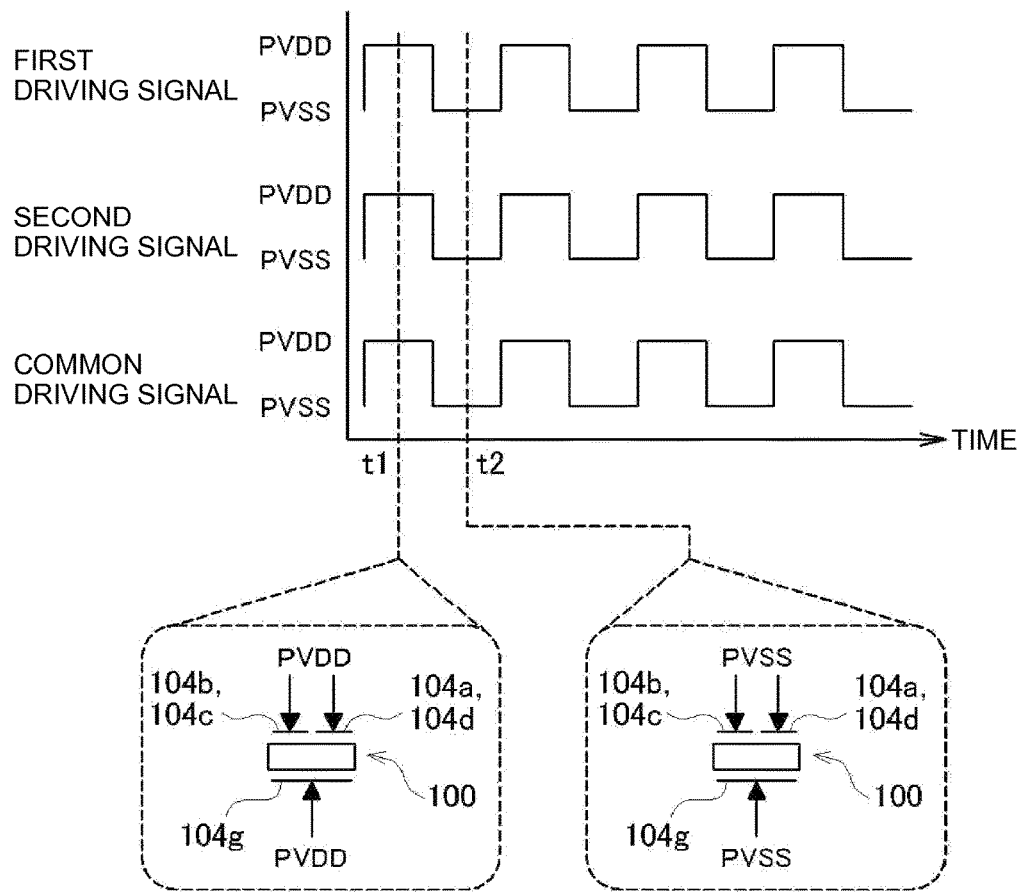
FIG. 5 is an explanatory diagram showing a state in which driving of the piezoelectric motor in the first embodiment is stopped.

FIG. 5 is an explanatory diagram showing a state in which the first driving signal and the second driving signal are output in a phase same as the phase of the common driving signal. As explained above with reference to FIG. 3, the first driving signal, the second driving signal, and the common driving signal are signals obtained by dividing the pulse signal generated by the pulse modulator 114 into three pulse signals and, after changing phases of the pulse signals, voltage-amplifying the respective pulse signals. Therefore, if the phase changer 116a and the phase changer 116b do not change the phases of the pulse signals, the first driving signal, the second driving signal, and the common driving signal can be switched at timings same as timings of the power supply voltage PVDD and the power supply voltage PVSS.

Therefore, for example, at time t1 in FIG. 5, all of the first driving signal, the second driving signal, and the common driving signal change to the power supply voltage PVDD. Therefore, the power supply voltage PVDD is applied to all the electrodes 104a to 104g of the vibrating body 100. This state is the same as a state in which a voltage is not applied to the vibrating body 100. At time t2 in FIG. 5, all of the first driving signal, the second driving signal, and the common driving signal change to the power supply voltage PVSS. Therefore, the power supply voltage PVSS is supplied to all the electrodes 104a to 104g of the vibrating body 100. This state is also the same as the state in which a voltage is not applied to the vibrating body 100. In this way, while the first driving signal and the second driving signal are output in the phase same as the phase of the common driving signal, although the first driving signal, the second driving signal, and the common driving signal are supplied, the vibrating body 100 is stopped.

Figures 6, 7:
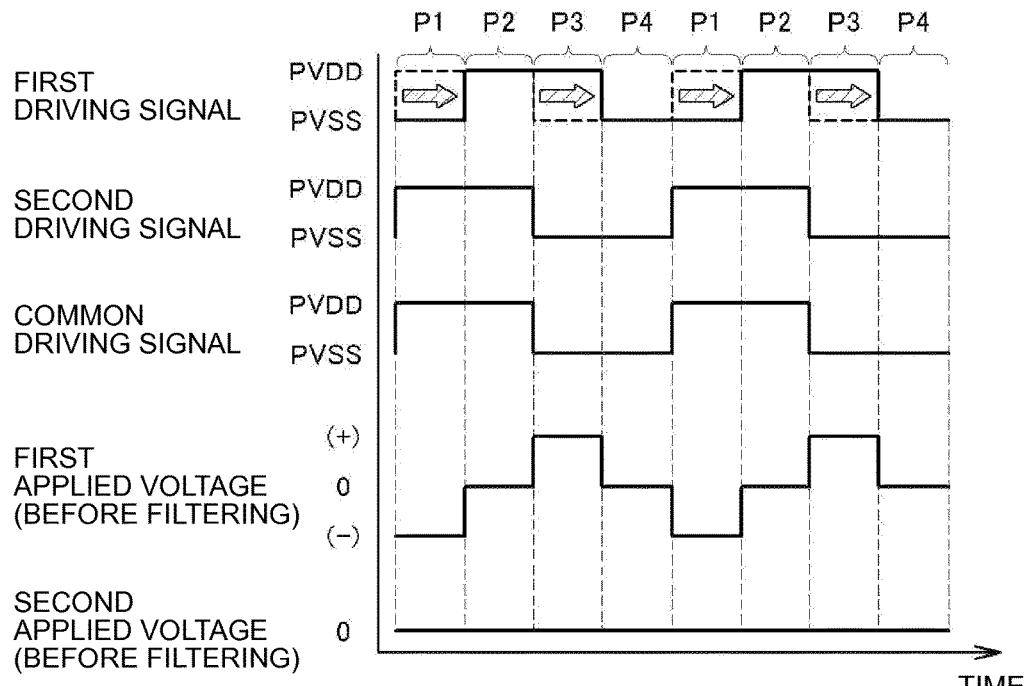
FIG. 6 is an explanatory diagram showing a state in which the piezoelectric motor in the first embodiment is driven in a normal rotation direction.
FIG. 7 is an explanatory diagram showing a state in which the piezoelectric motor in the first embodiment is driven in a reverse rotation direction.

FIG. 6 is an explanatory diagram showing a state in which the phase of the first driving signal is varied from the phase of the common driving signal. Note that, in FIG. 6, the phase of the first driving signal is delayed by 90 degrees. However, it is sufficient to vary the phases of the first driving signal and the common driving signal. Therefore, the phase of the first driving signal may be advanced with respect to the phase of the common driving signal. An angle for varying the phase does not have to be 90 degrees. The second driving signal has the phase same as the phase of the common driving signal. If the phase changer 116a of the driving-signal supplying section 110 explained above with reference to FIG. 3 changes the phase but the phase changer 116b does not change the phase, it is possible to output the first driving signal, the second driving signal, and the common driving signal explained above.

First, when attention is directed to the second driving signal and the common driving signal, the second driving signal and the common driving signal are switched to the power supply voltage PVDD and the power supply voltage PVSS at the same timing. Therefore, because of a reason same as the reason explained with reference to FIG. 5, this state is the same as a state in which a voltage is not applied to the second electrodes (the electrode 104b and the electrode 104c).

When attention is directed to the first driving signal and the common driving signal, the first driving signal and the common driving signal are switched to the power supply voltage PVDD and the power supply voltage PVSS at different timings. Therefore, four periods are generated according to which of states of the power supply voltage PVDD and the power supply voltage PVSS the first driving signal and the common driving signal take. In an example shown in FIG. 6, in a period P1, the first driving signal changes to the power supply voltage PVSS and the common driving signal changes to the power supply voltage PVDD. In a period P2, both of the first driving signal and the common driving signal change to the power supply voltage PVDD. In a period P3, the first driving signal changes to the power supply voltage PVDD and the common driving signal changes to the power supply voltage PVSS. In a period P4, both of the first driving signal and the common driving signal change to the power supply voltage PVSS.

Since the power supply voltage PVDD is higher than the power supply voltage PVSS, a state in the period P1 is the same as a state in which a negative voltage is applied to the first electrodes (the electrode 104a and the electrode 104d). A state in the period P2 is the same as a state in which a voltage is not applied to the first electrodes (the electrode 104a and the electrode 104d). A state in the period P3 is the same as a state in which a positive voltage is applied to the first electrodes (the electrode 104a and the electrode 104d). A state in the period P4 is the same as the state in which a voltage is not applied to the first electrodes (the electrode 104a and the electrode 104d). As a result, when the period P1 to the period P4 are repeated, a voltage applied between the first electrodes (the electrode 104a and the electrode 104d) and the common electrode (the electrode 104g) (hereinafter referred to as "first applied voltage") is a voltage that changes cyclically and stepwise as shown in FIG. 6.

Note that an absolute value of the positive and negative voltages applied in the period P1 and the period P3 is a voltage difference between the power supply voltage PVDD and the power supply voltage PVSS. As explained above with reference to FIG. 3, the first driving signal is actually supplied to the first electrodes (the electrode 104a and the electrode 104d) via the first low-pass filter circuit 119a. Therefore, a voltage having a waveform obtained by causing the voltage changing stepwise to pass through the first low-pass filter circuit 119a is applied to the first electrodes (the electrode 104a and the electrode 104d). Since the pulse width modulation is performed by the pulse modulator 114, a high-frequency pulse component can be removed by the first low-pass filter circuit 119a.

FIG. 7 is an explanatory diagram showing a state in which a phase of the second driving signal is varied from the phase of the common driving signal. Note that, in FIG. 7, the phase of the second driving signal is delayed by 90 degrees. However, it is sufficient to vary the phases of the second driving signal and the common driving signal. Therefore, the phase of the second driving signal may be advanced with respect to the phase of the common driving signal. An angle for varying the phase does not have to be 90 degrees. The first driving signal has the phase same as the phase of the common driving signal. If the phase changer 116a of the driving-signal supplying section 110 explained above with reference to FIG. 3 does not change the phase but the phase changer 116b changes the phase, it is possible to output the first driving signal, the second driving signal, and the common driving signal explained above.

In an example shown in FIG. 7, the first driving signal and the common driving signal are switched to the power supply voltage PVDD and the power supply voltage PVSS at the same timing. Therefore, this state is the same as a state in which a voltage is not applied to the first electrodes (the electrode 104a and the electrode 104d).

On the other hand, when attention is directed to the second driving signal and the common driving signal, four periods P1 to P4 are generated according to which of states of the power supply voltage PVDD and the power supply voltage PVSS the driving signals take. That is, the periods are the period P1 in which the second driving signal changes to the power supply voltage PVSS and the common driving signal changes to the power supply voltage PVDD, the period P2 in which both of the second driving signal and the common driving signal change to the power supply voltage PVDD, the period P3 in which the second driving signal changes to the power supply voltage PVDD and the common driving signal changes to the power supply voltage PVSS, and the period P4 in which both of the second driving signal and the common driving signal change to the power supply voltage PVSS.

Since the power supply voltage PVDD is higher than the power supply voltage PVSS, a state in the period P1 is the same as a state in which a negative voltage is applied to the second electrodes (the electrode 104b and the electrode 104c). A state in the period P2 is the same as a state in which a voltage is not applied to the second electrodes (the electrode 104b and the electrode 104c). A state in the period P3 is the same as a state in which a positive voltage is applied to the second electrodes (the electrode 104b and the electrode 104c). A state in the period P4 is the same as the state in which a voltage is not applied to the second electrodes (the electrode 104b and the electrode 104c). Therefore, when the period P1 to the period P4 are repeated, a voltage applied between the second electrodes (the electrode 104b and the electrode 104c) and the common electrode (the electrode 104g) (hereinafter referred to as "second applied voltage") is a voltage that changes cyclically and stepwise as shown in FIG. 7. Actually, a voltage having a waveform obtained by causing the voltage changing stepwise to pass through the second low-pass filter circuit 119b is applied to the second electrodes (the electrode 104b and the electrode 104c). Note that, concerning the second applied voltage, like the first applied voltage, since the pulse width modulation is performed by the pulse modulator 114, a high-frequency pulse component can be removed by the second low-pass filter circuit 119b.

A-3. Driving Method for the Piezoelectric Motor

Figure 8:
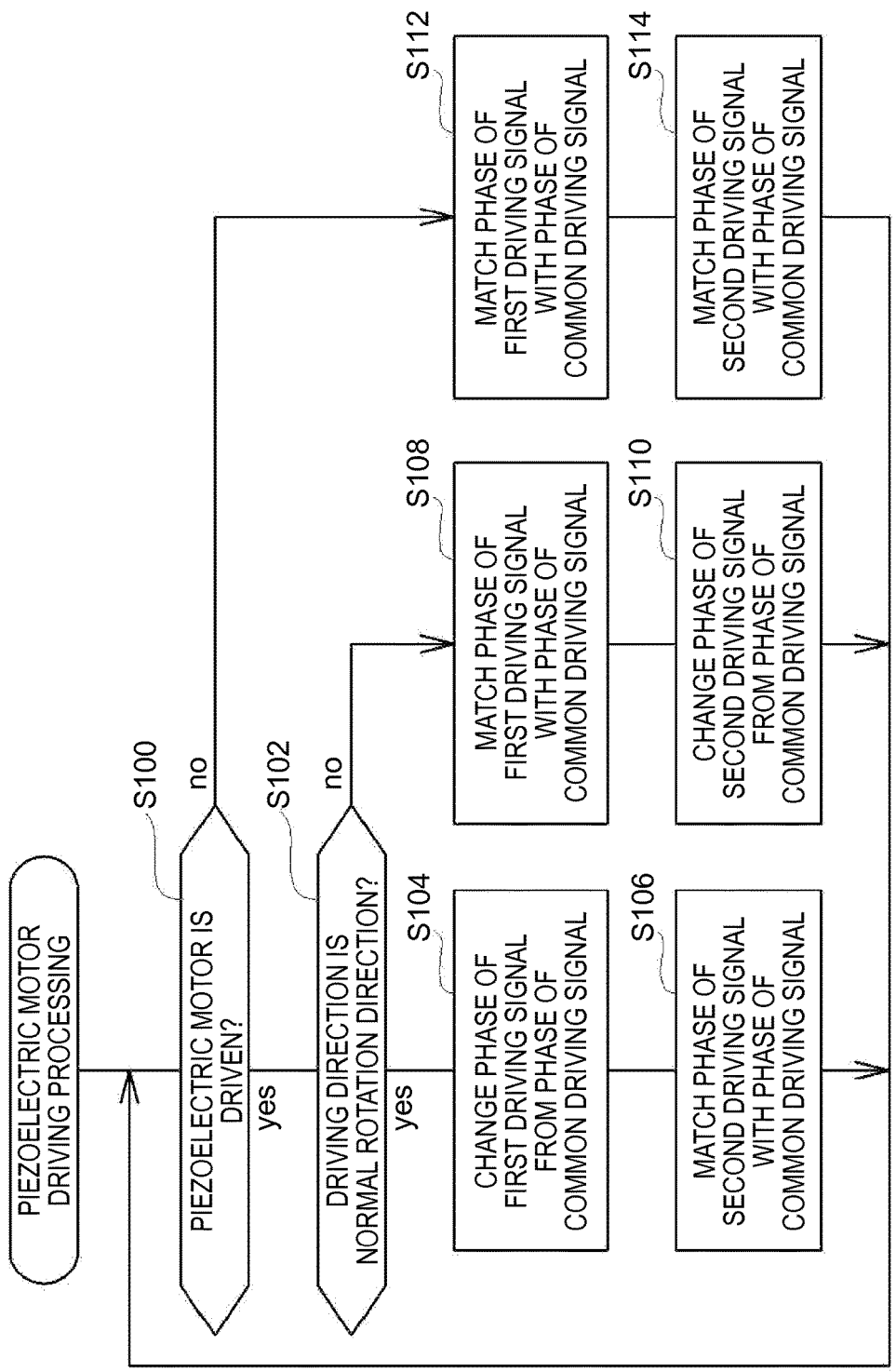
FIG. 8 is a flowchart of piezoelectric motor driving processing executed by a control section in order to drive the piezoelectric motor in the first embodiment.

FIG. 8 is a flowchart of piezoelectric motor driving processing executed by the control section 120 in order to drive the piezoelectric motor 10 in the first embodiment. In the piezoelectric motor driving processing, first, the control section 120 determines whether the piezoelectric motor 10 is driven (step S100). As a result, when determining that the piezoelectric motor 10 is not driven (no in step S100), the control section 120 matches the phase of the first driving signal output from the driving-signal supplying section 110 with the phase of the common driving signal (step S112) and matches the phase of the second driving signal with the phase of the common driving signal (step S114). If the control section 120 controls the phase changer 116a and the phase changer 116b in the driving-signal supplying section 110 not to change a phase of a pulse signal, it is possible to match the phases of the first driving signal and the second driving signal with the phase of the common driving signal.

As explained above with reference to FIG. 5, if the phase of the first driving signal matches with the phase of the common driving signal, this state is the same as the state in which a voltage is not applied to the first electrodes (the electrode 104a and the electrode 104d). Similarly, if the phase of the second driving signal matches with the phase of the common driving signal, this state is a state in which a voltage is not applied to the second electrodes (the electrode 104b and the electrode 104c). Therefore, the vibrating body 100 of the piezoelectric motor 10 does not vibrate. The projection 102 is pressed against the body to be driven.

On the other hand, when determining that the piezoelectric motor 10 is driven (yes in step S100), the control section 120 determines whether a driving direction is the normal rotation direction (step S102). As a result, when the driving direction is the normal rotation direction (yes in step S102), the control section 120 varies the phase of the first driving signal output from the driving-signal supplying section 110 from the phase of the common driving signal (step S104) and matches the phase of the second driving signal with the phase of the common driving signal (step S106). If the phase changer 116a in the driving-signal supplying section 110 is controlled to delay (or advance) the phase of the pulse signal, it is possible to vary the phase of the first driving signal from the phase of the common driving signal. If the phase changer 116b in the driving-signal supplying section 110 is controlled not to change the phase of the pulse signal, it is possible to match the phase of the second driving signal with the phase of the common driving signal. As explained above with reference to FIG. 6, if the phase of the first driving signal is varied from the phase of the common driving signal and the phase of the second driving signal is matched with the phase of the common driving signal, it is possible to vibrate the vibrating body 100 of the piezoelectric motor 10 in the normal rotation direction.

On the other hand, when the driving direction is not the normal rotation direction (no in step S102), the control section 120 matches the phase of the first driving signal output from the driving-signal supplying section 110 with the phase of the common driving signal (step S108) and varies the phase of the second driving signal from the phase of the common driving signal (step S110). If the phase changer 116a in the driving-signal supplying section 110 is controlled not to change the phase of the pulse signal, it is possible to match the phase of the first driving signal with the phase of the common driving signal. If the phase changer 116b in the driving-signal supplying section 110 is controlled to delay (or advance) the phase of the pulse signal, it is possible to vary the phase of the second driving signal from the phase of the common driving signal. As explained above with reference to FIG. 7, if the phase of the first driving signal is matched with the phase of the common driving signal and the phase of the second driving signal is varied from the phase of the common driving signal, it is possible to vibrate the vibrating body 100 of the piezoelectric motor 10 in the reverse rotation direction.

In this way, in the piezoelectric motor 10 in the first embodiment, the first driving signal, the second driving signal, and the common driving signal are continuously supplied from the driving-signal supplying section 110 to the vibrating body 100. Simply by changing the phase of the first driving signal or the second driving signal with respect to the phase of the common driving signal, it is possible to switch a stop state and a driving state of the piezoelectric motor 10 and, in the driving state, switch the driving direction to the normal rotation direction and the reverse rotation direction. Therefore, unlike the piezoelectric motor in the past, a switch for switching to which of the first electrodes (the electrode 104a and the electrode 104d) and the second electrodes (the electrode 104b and the electrode 104c) a voltage is applied is unnecessary. Therefore, it is possible to reduce the driving-signal supplying section 110 in size.

In the piezoelectric motor 10 in the first embodiment, the driving direction can be switched simply by changing the phases of the first driving signal and the second driving signal continuously output from the driving-signal supplying section 110 with respect to the phase of the common driving signal. Therefore, the driving direction can be practically instantaneously switched. Therefore, unlike the piezoelectric motor in the past, the piezoelectric motor does not become uncontrollable every time the driving direction is switched. As a result, it is also possible to perform delicate control for, for example, finely adjusting the position of the body to be driven and smoothly stopping the body to be driven.

A-4. Modifications of the First Embodiment

A-4-1. First Modification

In the explanation in the first embodiment, the phases of the first driving signal and the second driving signal can be changed with respect to the phase of the common driving signal but a change amount cannot be changed. For example, in the explanation in the examples shown in FIG. 6 or 7, the phase of the first driving signal or the second driving signal is delayed with respect to the phase of the common driving signal by 90 degrees or not delayed and an angle for delaying the phase cannot be reduced. However, the phases of the first driving signal and the second driving signal may be able to be changed with respect to the phase of the common driving signal continuously or in multiple stages.

Figure 9A:
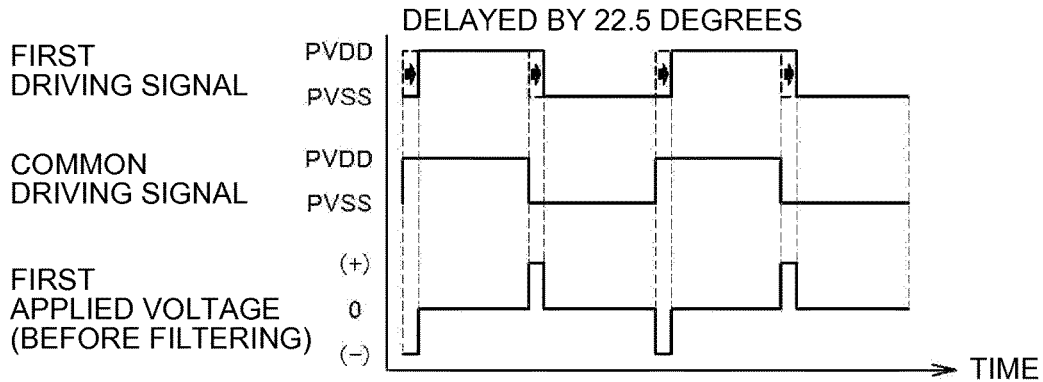
FIGS. 9A to 9C are explanatory diagrams concerning a driving method for the piezoelectric motor in a first modification of the first embodiment.
Figure 9B:
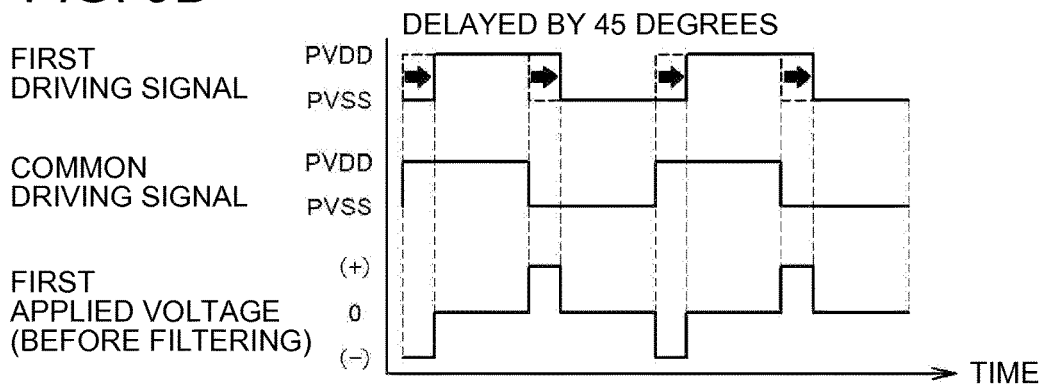
Figure 9C:
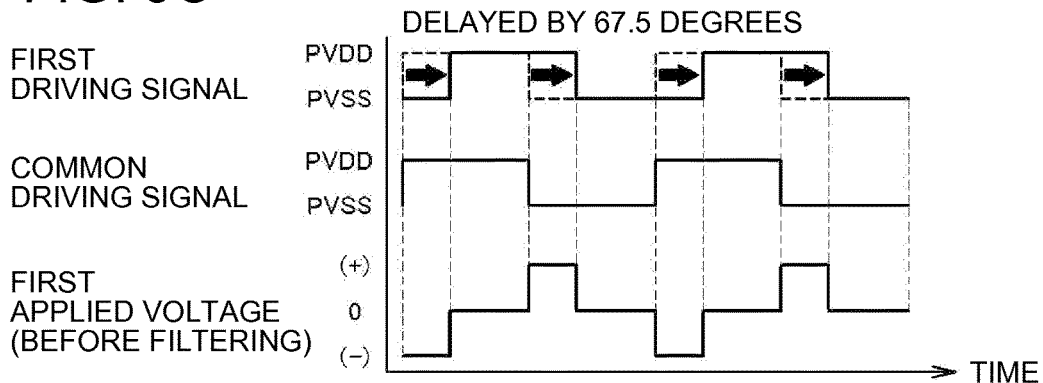

FIGS. 9A to 9C are explanatory diagrams concerning a modification (a first modification of the first embodiment) in which a delay of the phase of the first driving signal with respect to the phase of the common driving signal can be changed. Note that, in FIGS. 9A to 9C, it is assumed that the phase of the first driving signal is delayed with respect to the phase of the common driving signal. However, the phase of the first driving signal may be advanced with respect to the phase of the common driving signal. In FIGS. 9A to 9C, a relation between the first driving signal and the common driving signal is explained. However, the same exactly applies to a relation between the second driving signal and the common driving signal.

In FIGS. 9A to 9C, waveforms of the voltage (the first applied voltage) applied between the first electrodes (the electrode 104a and the electrode 104b) and the common electrode (the electrode 104g) when the delay of the phase of the first driving signal with respect to the phase of the common driving signal is variously changed are shown. For example, in FIG. 9A, a waveform of the first applied voltage applied when the phase of the first driving signal is delayed with respect to the phase of the common driving signal a little (22.5 degrees) is shown. In FIG. 9B, a waveform of the first applied voltage applied when the delay of the phase is slightly increased (to 45 degrees) is shown. In FIG. 9C, a waveform of the first applied voltage applied when the delay of the phase is slightly increased (to 67.5 degrees) is shown. A waveform of the first applied voltage applied when the delay of the phase of the first driving signal with respect to the phase of the common driving signal is changed to 90 degrees is shown in FIG. 6. A waveform of the first applied voltage applied when the phase of the common driving signal and the phase of the first driving signal are matched is shown in FIG. 7.

As shown in FIGS. 9A to 9C, as the delay of the phase of the first driving signal with respect to the phase of the common driving signal is increased, the first applied voltage changes from the state shown in FIG. 7 (the state in which a voltage is not applied) to the state shown in FIG. 6. Therefore, by increasing the delay of the phase of the first driving signal with respect to the phase of the common driving signal, it is possible to increase a driving force of the piezoelectric motor 10. The same exactly applies to the second driving signal. That is, by increasing the delay of the phase of the second driving signal with respect to the phase of the common driving signal, it is possible to increase the driving force of the piezoelectric motor 10. In this way, in the first modification, it is possible to not only instantaneously switch the driving direction of the piezoelectric motor 10 but also control the magnitude of the driving force. Therefore, it is possible to easily realize delicate control for, for example, finely adjusting the position of the body to be driven and smoothly stopping the body to be driven.

A-4-2. Second Modification

In the explanation in the first embodiment or the first modification, the four electrodes 104a to 104d are provided to divide the side surface of the vibrating body 100 into four (see FIG. 1). However, the driving method explained above can also be applied to the vibrating body 100 in which the number and the arrangement of electrodes are different.

Figure 10:
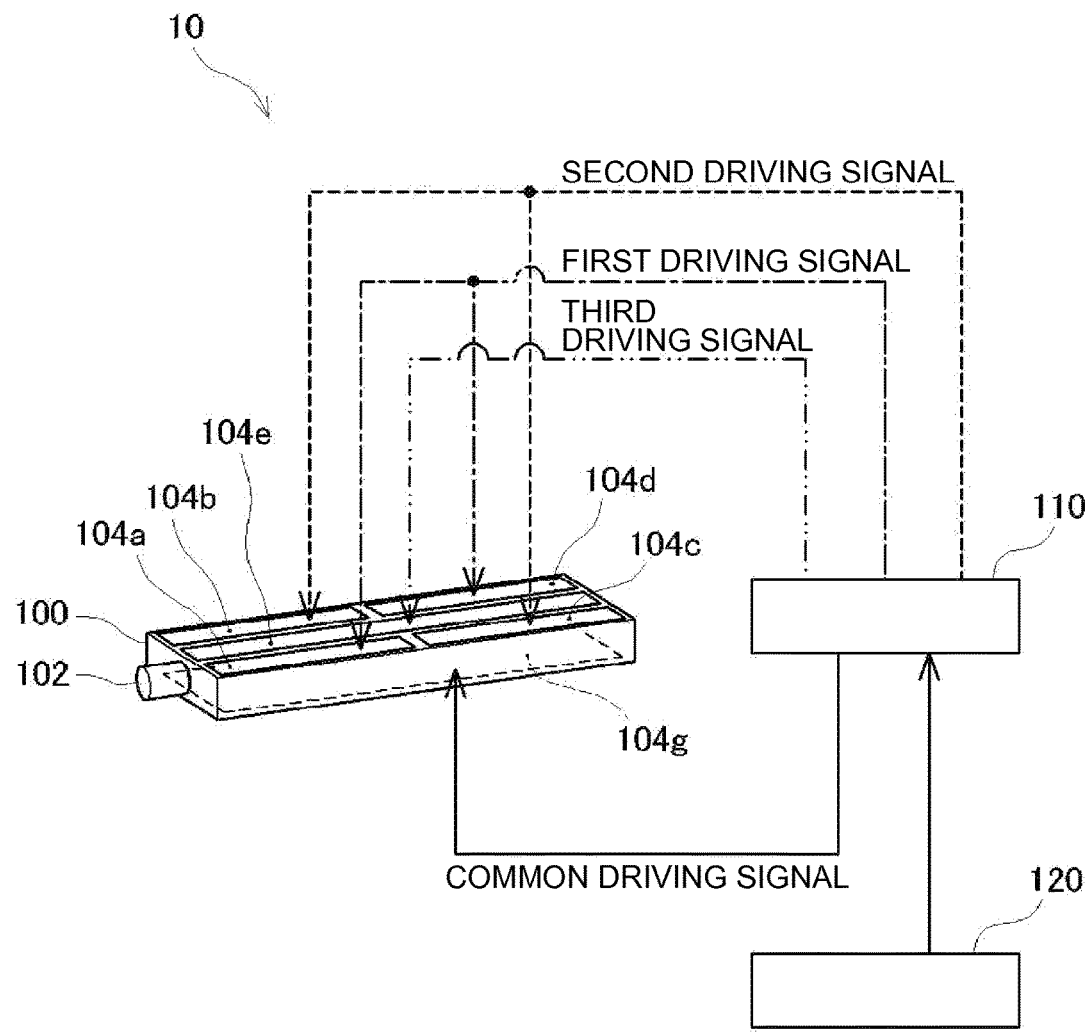
FIG. 10 is an explanatory diagram showing the rough configuration of the piezoelectric motor in a second modification of the first embodiment.

FIG. 10 is an explanatory diagram showing the rough configuration of the piezoelectric motor 10 in a modification (a second modification of the first embodiment) in which a third electrode (an electrode 104e) is provided on the side surface of the vibrating body 100 in addition to the first electrodes (the electrode 104a and the electrode 104d) and the second electrodes (the electrode 104b and the electrode 104c). The piezoelectric motor 10 in the second modification of the first embodiment shown in FIG. 10 is different from the piezoelectric motor 10 in the first embodiment explained with reference to FIG. 1 in that the third electrode (the electrode 104e) is provided and that a third driving signal is supplied from the driving-signal supplying section 110 to the third electrode (the electrode 104e). Otherwise, the piezoelectric motor 10 in the second modification is the same as the piezoelectric motor 10 in the first embodiment. Note that components in the second modification same as the components in the first embodiment are denoted by the same reference numerals and signs and detailed explanation of the components is omitted.

As shown in FIG. 10, in the vibrating body 100 in the second modification, the elongated third electrode (electrode 104e) is provided in the center of a side surface. The electrode 104a and the electrode 104c are provided on a side of the third electrode (the electrode 104e). The electrode 104b and the electrode 104d are provided on a side on the opposite side of the electrode 104a and the electrode 104c.

Figure 11:
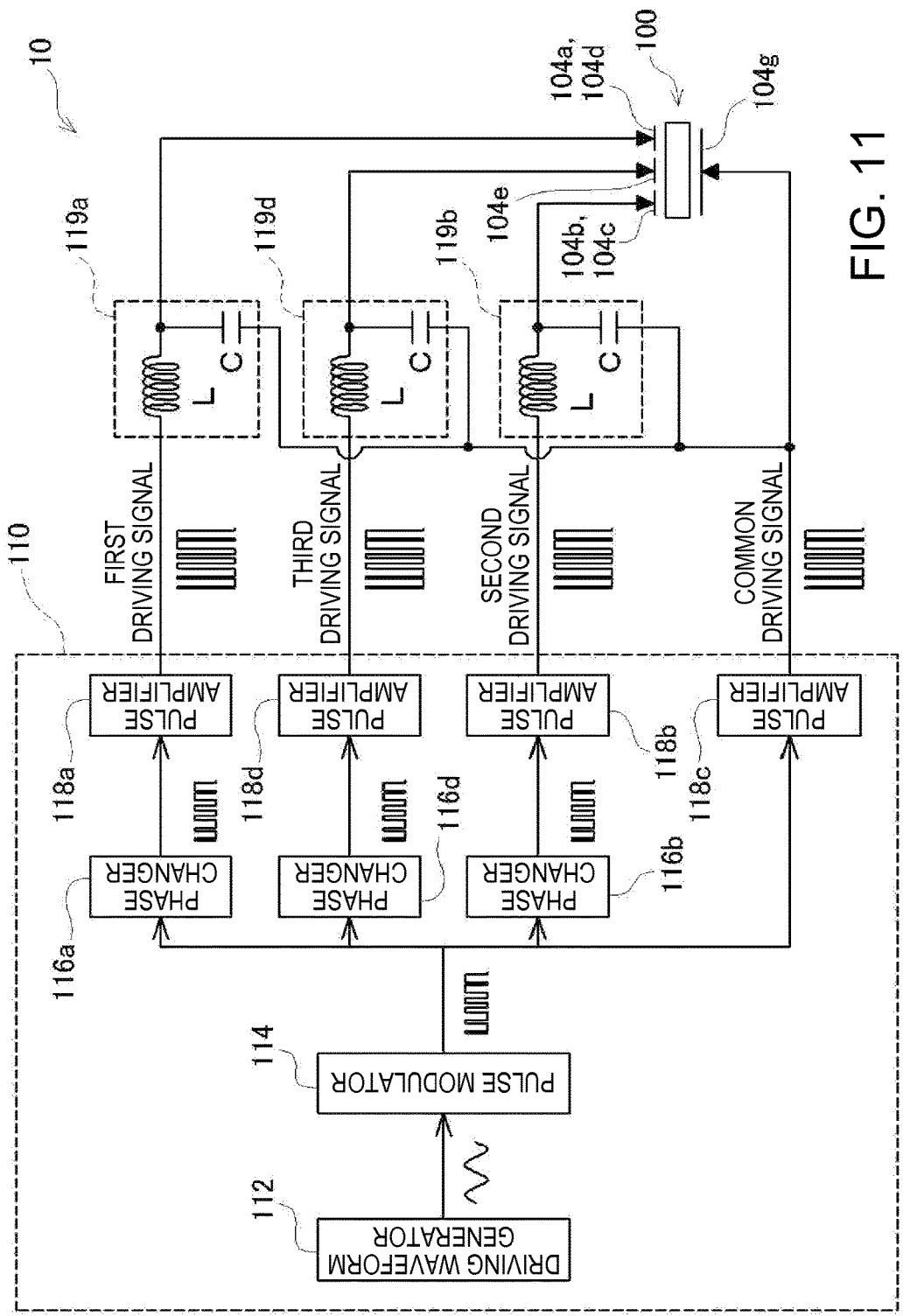
FIG. 11 is a block diagram showing the internal configuration of the driving-signal supplying section used in the second modification of the first embodiment.

FIG. 11 is a block diagram showing the internal configuration of the driving-signal supplying section 110 used in the second modification of the first embodiment. In the driving-signal supplying section 110 in the second modification shown in FIG. 11, a phase changer 116d, a pulse amplifier 118d, and a third low-pass filter circuit 119d for outputting the third driving signal are added to the driving-signal supplying section 110 in the first embodiment explained above with reference to FIG. 3. Differences from the driving-signal supplying section 110 in the first embodiment are mainly explained. The driving-signal supplying section 110 in the second modification is briefly explained.

In the driving-signal supplying section 110 in the second modification, the driving waveform generator 112 and the pulse modulator 114 are also provided. The pulse modulator 114 pulse-width modulates a voltage waveform generated by the driving waveform generator 112 and generates a pulse signal. In the driving-signal supplying section 110 in the second modification, the pulse signal is divided into four pulse signals. Three pulse signals among the four pulse signals are respectively supplied to the three phase changers 116a, 116b, and 116d. As in the first embodiment, the phase changer 116a and the phase changer 116b are respectively phase changers for generating the first driving signal and the second driving signal. The phase changer 116d is a phase changer for generating the third driving signal. As in the first embodiment, the remaining one pulse signal is supplied to the pulse amplifier 118c and, after being voltage-amplified, supplied to the common electrode (the electrode 104g) as the common driving signal.

After being voltage-amplified by the pulse amplifier 118a, the pulse signal supplied to the phase changer 116a is output as the first driving signal and supplied to the first electrodes (the electrode 104a and the electrode 104d) via the first low-pass filter circuit 119a. Similarly, after being voltage-amplified by the pulse amplifier 118b, the pulse signal supplied to the phase changer 116b is output as the second driving signal and supplied to the second electrodes (the electrode 104b and the electrode 104c) via the second low-pass filter circuit 119b. Further, after being voltage-amplified by the pulse amplifier 118d, the pulse signal supplied to the phase changer 116d is output as the third driving signal and supplied to the third electrode (the electrode 104e) via the third low-pass filter circuit 119d. The third low-pass filter circuit 119d is formed by inductive components such as a coil L and capacitive components such as a capacitor C.

Figure 12:
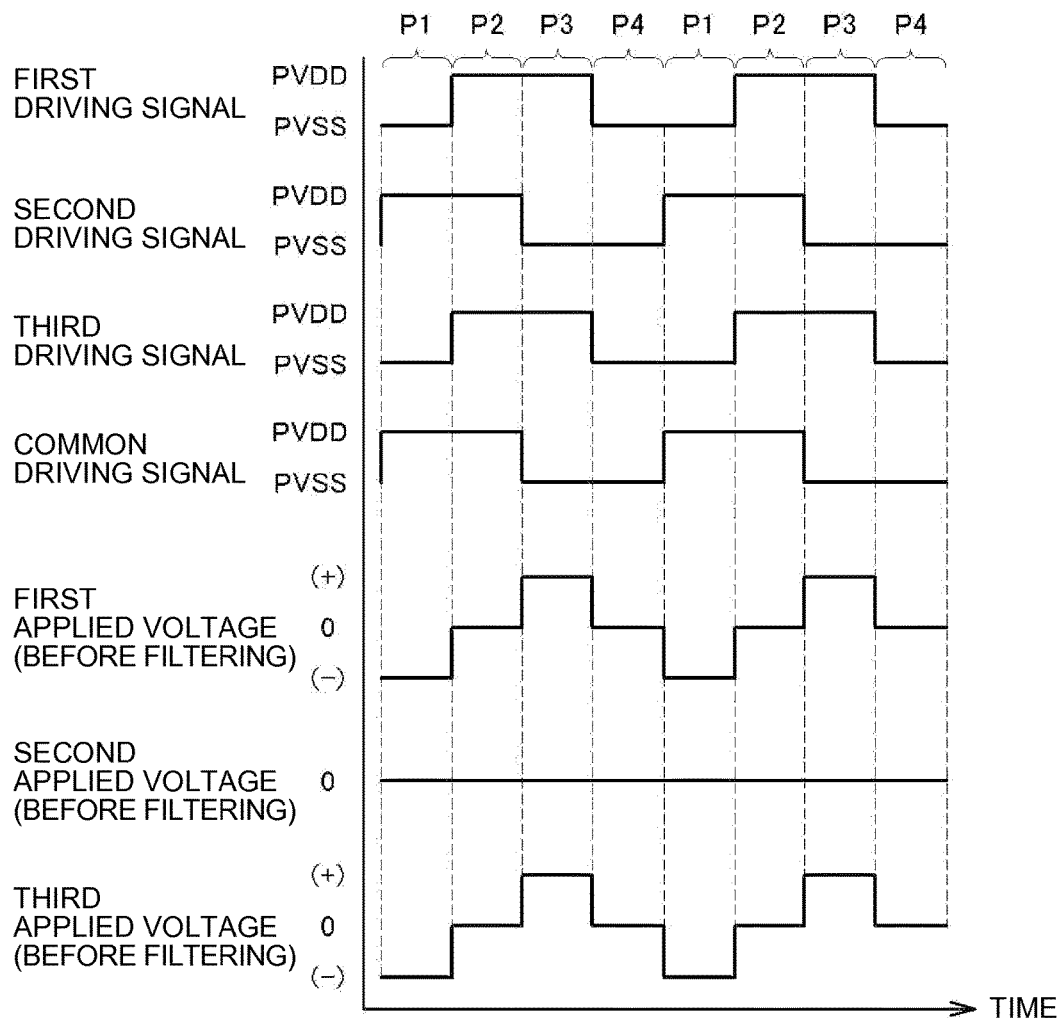
FIG. 12 is an explanatory diagram concerning a driving method for the piezoelectric motor in the second modification of the first embodiment.

FIG. 12 is an explanatory diagram showing a state in which the piezoelectric motor 10 in the second modification of the first embodiment is driven. In an example shown in the figure, phases of the first driving signal and the third driving signal are changed with respect to the phase of the common driving signal. However, phases of the second driving signal and the third driving signal may be changed with respect to the phase of the common driving signal. In the example shown in the figure, the phases are delayed with respect to the phase of the common driving signal by 90 degrees. However, the phases may be advanced. Further, a change amount of the phases is not limited to 90 degrees and may be values other than 90 degrees.

In the example shown in FIG. 12, the phase of the second driving signal is the same as the phase of the common driving signal. Therefore, because of the reason explained with reference to FIG. 5, the voltage (the second applied voltage) is not applied between the second electrodes (the electrode 104b and the electrode 104c) and the common electrode (the electrode 104g).

On the other hand, the phases of the first driving signal and the third driving signal are different from the phase of the common driving signal. Therefore, because of the reason explained with reference to FIG. 6, the voltage (the first applied voltage) applied between the first electrodes (the electrode 104a and the electrode 104d) and the common electrode (the electrode 104g) is a voltage that changes cyclically and stepwise. Similarly, a voltage (a third applied voltage) applied between the third electrode (the electrode 104e) and the common electrode (the electrode 104g) is also a voltage that changes cyclically and stepwise. Note that, as explained above with reference to FIG. 11, since the first low-pass filter circuit 119a is provided between the driving-signal supplying section 110 and the first electrodes (the electrode 104a and the electrode 104d), an actually applied voltage is a voltage obtained by causing the first applied voltage shown in FIG. 12 to pass through the first low-pass filter circuit 119a. Similarly, since the third low-pass filter circuit 119d is provided between the driving-signal supplying section 110 and the third electrode (the electrode 104e), an actually applied voltage is a voltage obtained by causing the third applied voltage shown in FIG. 12 to pass through the third low-pass filter circuit 119d.

In the second modification of the first embodiment, as in the first embodiment, it is possible to simultaneously cause the bending vibration and the longitudinal vibration of the vibrating body 100 by varying the phase of the first driving signal supplied to the first electrodes (the electrode 104a and the electrode 104d) and the phase of the common driving signal supplied to the common electrode (the electrode 104g). Therefore, it is possible to cause the projection 102 (see FIGS. 2A and 2B) of the vibrating body 100 to perform an elliptic motion in the normal rotation direction. However, the longitudinal vibration of the vibrating body 100 occurs incidentally to the bending vibration of the vibrating body 100. Therefore, the magnitude of the longitudinal vibration with respect to the magnitude of the bending vibration is not always optimum. A track of the elliptic motion of the projection 102 of the vibrating body 100 is not always an optimum track.

However, the third electrode (the electrode 104e) is provided in the second modification of the first embodiment. Since the third electrode (the electrode 104e) is provided in the center of the side surface of the vibrating body 100, even if positive and negative voltages are alternately applied between the third electrode (the electrode 104e) and the common electrode (the electrode 104g), only the longitudinal vibration occurs and the bending vibration does not occur. Therefore, in the piezoelectric motor 10 in the second modification of the first embodiment, if the size of the third electrode (the electrode 104e) is appropriately set in advance, it is possible to cause the projection 102 of the vibrating body 100 to perform the elliptic motion on an optimum track. Alternatively, it is also possible to cause the projection 102 of the vibrating body 100 to perform the elliptic motion on the optimum track by varying a voltage value amplified by the pulse amplifier 118d (see FIG. 11) for generating the third driving signal from the voltages (the power supply voltage PVDD and the power supply voltage PVSS) of the other pulse amplifiers 118a and 118b and setting the voltage value to an appropriate voltage value.

In the above explanation, the phases of the first driving signal and the third driving signal are changed with respect to the common driving signal. Consequently, when the phases of the second driving signal and the third driving signal are changed with respect to the phase of the common driving signal, a direction in which the projection 102 of the vibrating body 100 performs the elliptic motion is simply reversed. Otherwise, completely the same explanation applies. That is, by varying the phase of the second driving signal from the phase of the common driving signal, it is possible to cause the bending vibration and the longitudinal vibration in the vibrating body 100. As a result, it is possible to cause the projection 102 of the vibrating body 100 to perform the elliptic motion in the reverse rotation direction. Further, by varying the phase of the third driving signal from the phase of the common driving signal, it is possible to cause the longitudinal vibration in the vibrating body 100. As a result, it is possible to cause the projection 102 of the vibrating body 100 to perform the elliptic motion on the optimum track.

A-4-3. Third Modification

In the explanation in the second modification of the first embodiment, irrespective of which phase of the first driving signal or the second driving signal is changed with respect to the common driving signal, the phase of the third driving signal is changed with respect to the phase of the common driving signal by an amount same as an amount of the change. However, the phase of the third driving signal may be able to be changed with respect to the phase of the common driving signal separately from the change amount of the phase of the first driving signal or the second driving signal.

Figure 13:
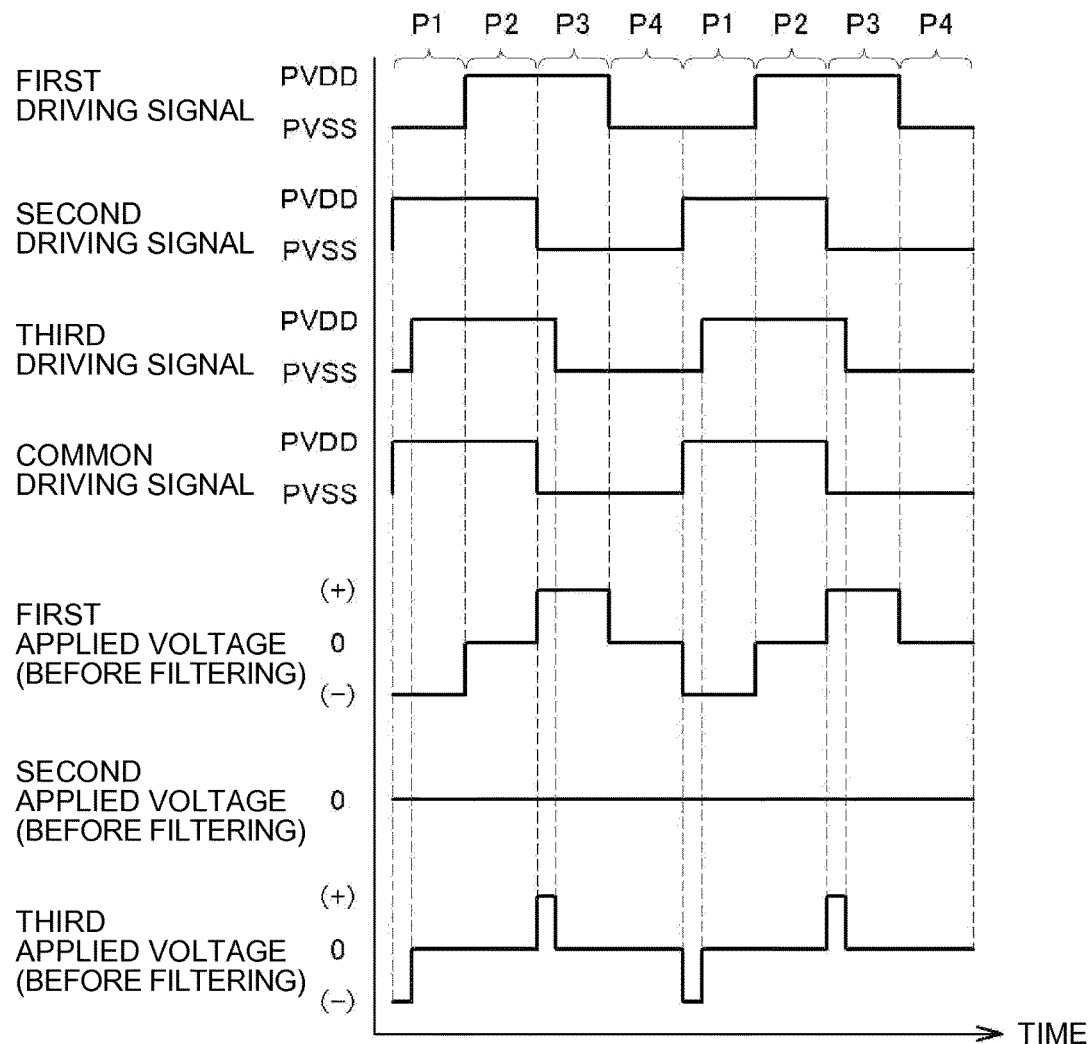
FIG. 13 is an explanatory diagram concerning a driving method for the piezoelectric motor in a third modification of the first embodiment.

FIG. 13 is an explanatory diagram showing a state in which the piezoelectric motor 10 in a modification (a third modification of the first embodiment) in which the phase of the third driving signal can be changed with respect to the phase of the common driving signal separately from the change amount of the phase of the first driving signal or the second driving signal is driven. When FIG. 13 is compared with FIG. 12, which is the explanatory diagram concerning the second modification of the first embodiment, delay amounts of the phases of the first driving signal and the third driving signal with respect to the phase of the common driving signal are the same in FIG. 12. On the other hand, in FIG. 13, delays of the phases of the first driving signal and the third driving signal with respect to the phase of the common driving signal are not the same. Note that, in an example shown in the figure, the phases of the first driving signal and the third driving signal are changed with respect to the phase of the common driving signal. However, the phases of the second driving signal and the third driving signal may be changed with respect to the phase of the common driving signal. In the example shown in the figure, the phase is delayed with respect to the phase of the common driving signal. However, the phase may be advanced. Further, the change amount of the phase of the first driving signal or the second driving signal with respect to the phase of the common driving signal is not limited to 90 degrees and may be values other than 90 degrees.

In the third modification of the first embodiment shown in FIG. 13, as in the second modification of the first embodiment shown in FIG. 12, if the phase of the first driving signal is varied from the phase of the common driving signal and the phase of the third driving signal is varied from the phase of the common driving signal, it is possible to cause the projection 102 of the vibrating body 100 to perform the elliptic motion in the normal rotation direction.

In addition, the phase of the third driving signal with respect to the phase of the common driving signal can be varied from the phase of the first driving signal with respect to the phase of the common driving signal. For example, in an example shown in FIG. 13, a delay of the phase of the third driving signal with respect to the phase of the common driving signal is smaller than a delay of the phase of the first driving signal with respect to the phase of the common driving signal. Because of the reason explained with reference to FIGS. 9A to 9C, as the delay of the phase of the third driving signal with respect to the phase of the common driving signal is further reduced, the third applied voltage (the voltage applied between the third electrode (the electrode 104e) and the common electrode (the electrode 104g)) further decreases. Therefore, in the third modification of the first embodiment, by making it possible to change the phase of the third driving signal with respect to the phase of the common driving signal continuously or in a plurality of stages, it is possible to change the magnitude of the longitudinal vibration of the vibrating body 100. As a result, it is possible to change the elliptical track of the projection 102 to a more appropriate shape according to the body to be driven that is driven by the piezoelectric motor 10.

B. Second Embodiment

In the first embodiment and the modifications of the first embodiment, three driving states explained below can be realized as driving states of the piezoelectric motor 10. A first driving state is a driving state in which the phase of the first driving signal is varied from the phase of the common driving signal and the phase of the second driving signal is matched with the phase of the common driving signal. In this driving state, the piezoelectric motor 10 is driven in the normal rotation direction. A second driving state is a driving state in which the phase of the first driving signal is matched with the phase of the common driving signal and the phase of the second driving signal is varied from the phase of the common driving signal. In this driving state, the piezoelectric motor 10 is driven in the reverse rotation direction. Further, a third driving state is a driving state in which both of the phase of the first driving signal and the phase of the second driving signal are matched with the phase of the common driving signal. In this driving state, the vibrating body 100 of the piezoelectric motor 10 does not vibrate. Therefore, the projection 102 (see FIG. 1) of the vibrating body 100 is kept pressed against the body to be driven. The piezoelectric motor 10 holds the body to be driven not to move.

In addition to the three driving states, a fourth driving state can also be realized. The fourth driving state is a driving state in which the phase of the first driving signal is varied from the phase of the common driving signal and the phase of the second driving signal is also varied from the phase of the common driving signal. Note that, in this case, the phase of the first driving signal and the phase of the second driving signal may be the same or may be different. As explained in detail below, in the fourth driving state, the piezoelectric motor 10 can be changed to an idling state. That is, it is possible to realize a driving state in which the body to be driven cannot be held by a strong force because the vibrating body 100 performs the longitudinal vibration and, in addition, when the phase of the first driving signal and the phase of the second driving signal are the same, a driving force is not generated at all and, when the phase of the first driving signal and the phase of the second driving signal are different, a driving force is generated.

FIGS. 14A to 14D are explanatory diagrams showing four basic driving states of the piezoelectric motor 10 in the second embodiment. In a driving state shown in FIG. 14A, the first driving signal, the second driving signal, and the common driving signal are output to the vibrating body 100 in the same phase. As explained above with reference to FIG. 5, this state is the same as a state in which a voltage is not applied to the vibrating body 100. The vibrating body 100 does not vibrate. Therefore, the projection 102 of the vibrating body 100 is pressed against the body to be driven. The piezoelectric motor 10 holds the body to be driven.

Figure 14A:
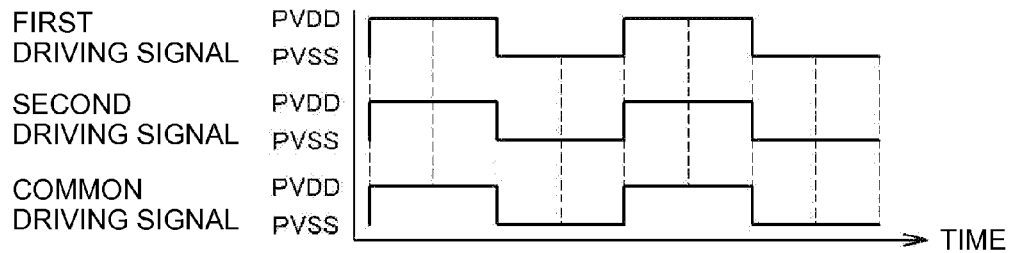
FIGS. 14A to 14D are explanatory diagrams showing four basic driving states of the piezoelectric motor in a second embodiment.
Figure 14B:
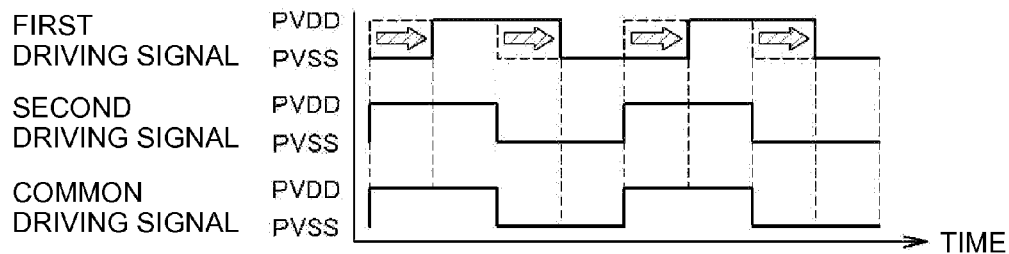
Figure 14C:
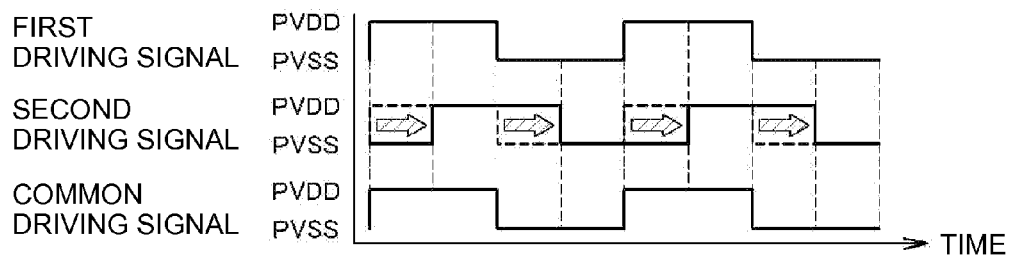

In a driving state shown in FIG. 14B, the first driving signal and the common driving signal are output in different phases but the second driving signal and the common driving signal are output in the same phase. As explained above with reference to FIG. 6, in this state, the piezoelectric motor 10 is driven in the normal rotation direction. In a driving state shown in FIG. 14C, the first driving signal and the common driving signal are output in the same phase but the second driving signal and the common driving signal are output in different phases. As explained above with reference to FIG. 7, in this state, the piezoelectric motor 10 is driven in the reverse rotation direction.

Figure 14D:
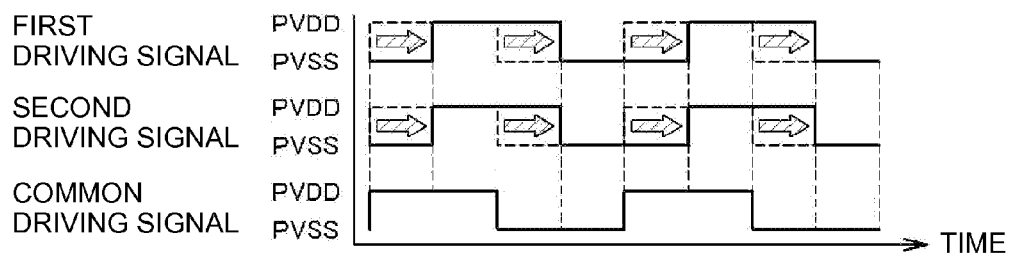

A driving state shown in FIG. 14D is a driving state peculiar to the second embodiment. The first driving signal is output in a phase different from the phase of the common driving signal and the second driving signal is also output in a phase different from the phase of the common driving signal. Note that the first driving signal and the second driving signal may have the same phase or may have different phases. The operation of the piezoelectric motor 10 is different in the case of the same phase and in the case of the different phases. In this explanation, it is assumed that the first driving signal and the second driving signal have the same phase. The operation in the case of the different phases is explained after this explanation.

In the driving state shown in FIG. 14D, since the phase of the first driving signal is different from the phase of the common driving signal, the first applied voltage shown in FIG. 6 is applied between the first electrodes (the electrode 104a and the electrode 104d) and the common electrode (the electrode 104g). Similarly, since the phase of the second driving signal is different from the phase of the common driving signal, the second applied voltage shown in FIG. 7 is applied between the second electrodes (the electrode 104b and the electrode 104c) and the common electrode (the electrode 104g). Therefore, a force for causing the vibrating body 100 to perform the bending vibration in the normal rotation direction and a force for causing the vibrating body 100 to perform the bending vibration in the reverse rotation direction cancel each other. Only the longitudinal vibration occurs in the vibrating body 100. Therefore, the piezoelectric motor 10 does not drive the body to be driven. The projection 102 of the vibrating body 100 repeats a pressed state to the body to be driven and a separated state from the body to be driven. A force of the piezoelectric motor 10 for holding the body to be driven is small. Consequently, in the driving state shown in FIG. 14D, it is possible to realize a state in which the piezoelectric motor 10 is idling. Note that, in this specification, a state in which only the longitudinal vibration occurs in the vibrating body 100 and the body to be driven is not driven to both of the normal rotation direction and the reverse rotation direction is referred to as "idling state".

In addition, in the piezoelectric motor 10 in the second embodiment, it is also possible to change a holding force in the idling state. In FIGS. 15A to 15D, a state is shown in which the holding force in the idling state is changed in the piezoelectric motor 10 in the second embodiment. In a driving state shown in FIG. 15A, since the first driving signal and the second driving signal are output in phases same as the phase of the common driving signal, the vibrating body 100 does not vibrate at all. Therefore, the holding force of the piezoelectric motor 10 is the largest.

Figure 15A:
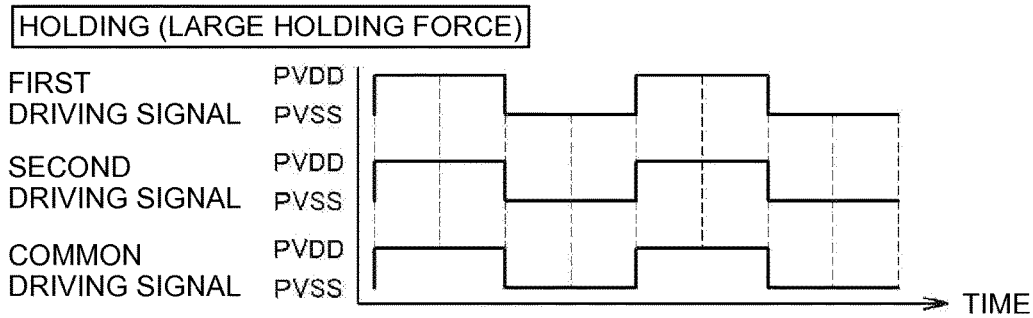
FIGS. 15A to 15D are explanatory diagrams concerning a method in which the piezoelectric motor in the second embodiment changes a holding force in an idling state.
Figure 15B:
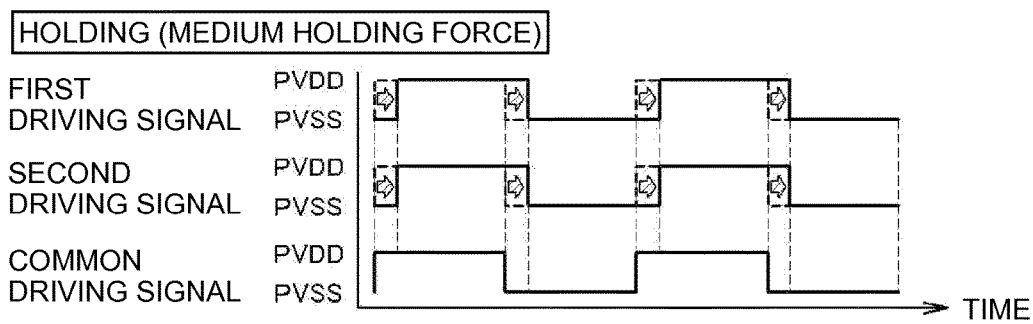

In a driving state shown in FIG. 15B, the first driving signal and the second driving signal are output in phases slightly different from the phase of the common driving signal. The first driving signal and the second driving signal have the same phase. Therefore, since the vibrating body 100 slightly vibrates in a stretching direction, the holding force of the piezoelectric motor 10 is slightly smaller than the holding force in the state shown in FIG. 15A.

Figure 15C:
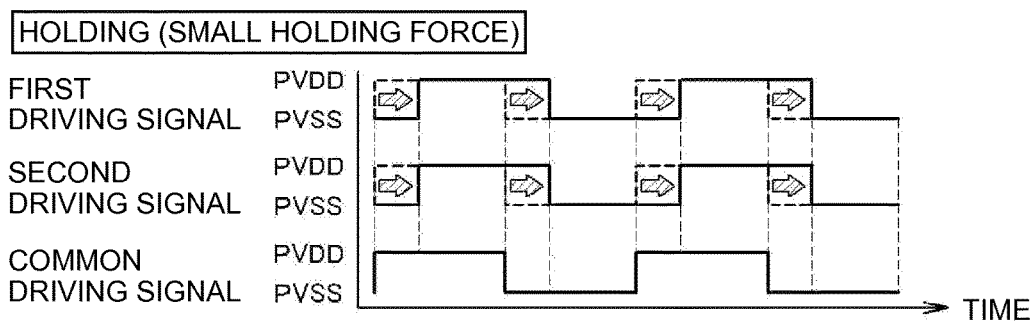

In a driving state shown in FIG. 15C, a phase difference of the first driving signal and the second driving signal from the common driving signal is larger compared with the driving state shown in FIG. 15B. Therefore, since the longitudinal vibration of the vibrating body 100 is larger than the longitudinal vibration in the driving state shown in FIG. 15B, the holding force of the piezoelectric motor 10 is smaller than the holding force in the driving state shown in FIG. 15B.

Figure 15D:
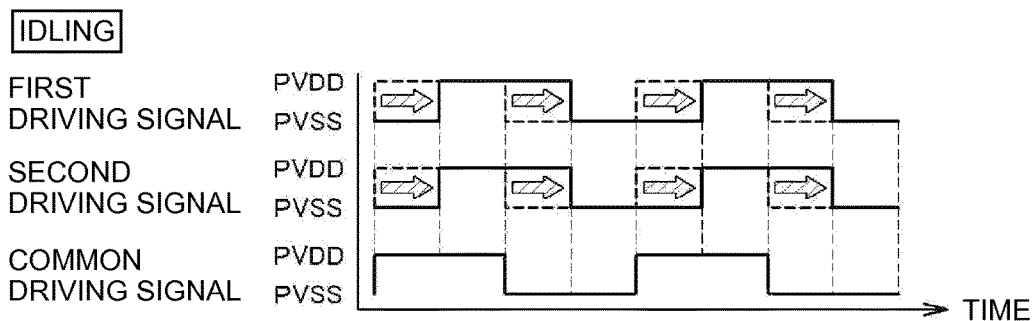

In a driving state shown in FIG. 15D, the phase difference of the first driving signal and the second driving signal from the common driving signal is larger compared with the driving state shown in FIG. 15C. This driving state is the same as the driving state shown in FIG. 14D. As explained above, the holding force of the piezoelectric motor 10 in this state is small.

As explained above, in the piezoelectric motor 10 in the second embodiment, by changing the phases of the first driving signal and the second driving signal with respect to the phase of the common driving signal while keeping the first driving signal and the second driving signal in the same phase, it is possible to reduce the holding force in the idling state from the state of FIG. 15A in which the piezoelectric motor 10 is holding the body to be driven. Note that, in FIGS. 15A to 15D, the holding force is switched in four stages. However, if the phases of the first driving signal and the second driving signal are continuously changed with respect to the phase of the common driving signal, it is possible to continuously change the holding force in the idling state. If the phases of the first driving signal and the second driving signal are switched in multiple stages with respect to the phase of the common driving signal, it is also possible to switch the holding force according to the number of stages of the switching.

In the above explanation, the phases of the first driving signal and the second driving signal are changed with respect to the phase of the common driving signal while the first driving signal and the second driving signal are kept in the same phase. On the other hand, it is also possible to vary the phases of the first driving signal and the second driving signal from the phase of the common driving signal and vary the phase of the first driving signal and the phase of the second driving signal from each other.

FIGS. 16A to 16D are explanatory diagrams concerning the operation of the piezoelectric motor 10 performed when the phases of the first driving signal and the second driving signal are varied from the phase of the common driving signal and the phase of the first driving signal and the phase of the second driving signal are also varied from each other.

Figure 16A:
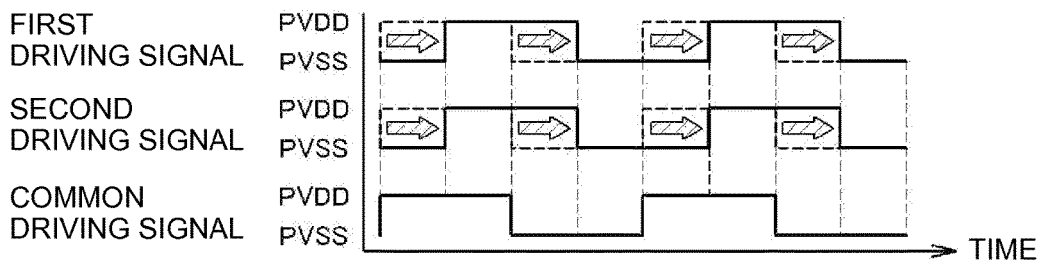
FIGS. 16A to 16D are explanatory diagrams concerning a method in which the piezoelectric motor in the second embodiment applies a driving force in a normal rotation direction from the idling state.

In FIG. 16A, a state is shown in which the phases of the first driving signal and the second driving signal are delayed with respect to the phase of the common driving signal by 90 degrees. As explained above with reference to FIG. 14D, in such a driving state, the piezoelectric motor 10 is in the idling state.

Figure 16B:
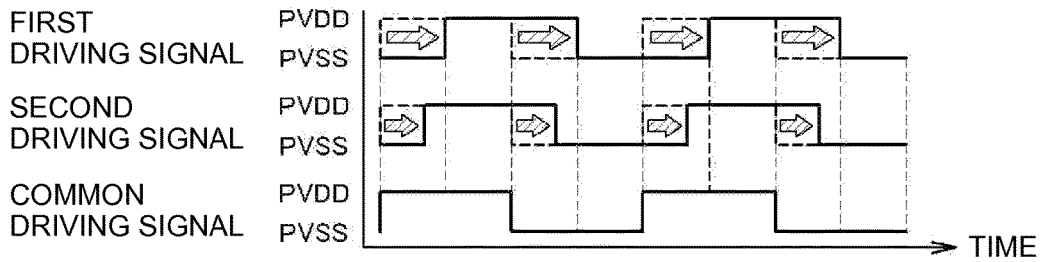

In FIG. 16B, a state is shown in which the delay of the phase of the second driving signal with respect to the phase of the common driving signal is slightly reduced from the state shown in FIG. 16A. In this state, the first applied voltage (the voltage applied between the first electrodes (the electrode 104a and the electrode 104d) and the common electrode (the electrode 104g)) is the same as the voltage in the state shown in FIG. 16A. However, since the delay of the phase of the second driving signal with respect to the phase of the common driving signal is slightly reduced, the second applied voltage (the voltage applied between the second electrodes (the electrode 104b and the electrode 104c) and the common electrode (the electrode 104g) is slightly suppressed from the voltage in the state shown in FIG. 16A. Therefore, since a force for driving the vibrating body 100 in the reverse rotation direction is slightly smaller than a force for driving the vibrating body 100 in the normal rotation direction, the vibrating body 100 performs the bending vibration in the normal rotation direction a little while mainly performing the longitudinal vibration. As a result, a driving state is realized in which the piezoelectric motor 10 drives the vibrating body 100 in the normal rotation direction with a small force, although the driving state is roughly close to the idling state.

Figure 16C:
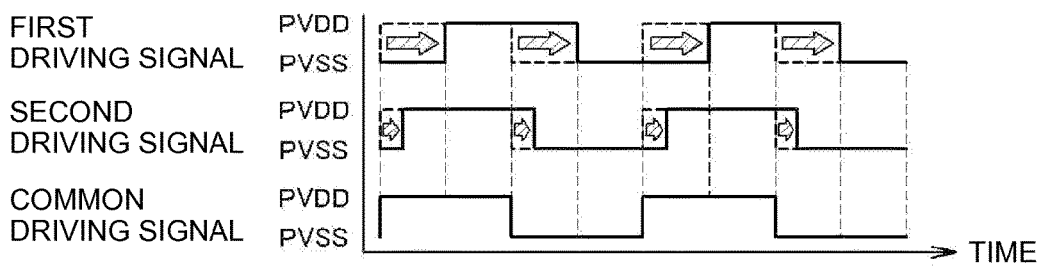

In FIG. 16C, a state is shown in which the delay of the phase of the second driving signal with respect to the phase of the common driving signal is further slightly reduced from the state shown in FIG. 16B (therefore, a state in which the phase of the second driving signal is brought close to the phase of the common driving signal). Therefore, the second applied voltage is further suppressed than the second applied voltage in the state shown in FIG. 16B. The bending vibration of the vibrating body 100 in the normal rotation direction is larger than the bending vibration in the state shown in FIG. 16B. As a result, a driving state is realized in which the piezoelectric motor 10 drives the vibrating body 100 in the normal rotation direction with a force larger than the force in the state shown in FIG. 16B.

Figure 16D:
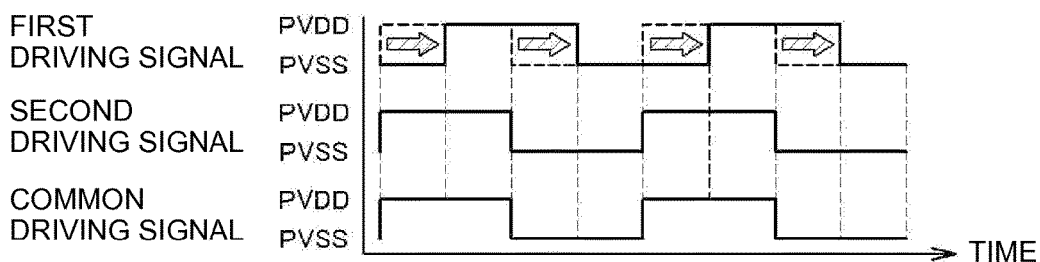

In FIG. 16D, a state is shown in which the phase of the first driving signal is delayed with respect to the phase of the common driving signal by 90 degrees but the phase of the second driving signal is the same as the phase of the common driving signal. As explained above with reference to FIG. 14B, in such a driving state, the piezoelectric motor 10 changes to the normal rotation state.

Note that, in the above explanation, the phase of the second driving signal is changed with respect to the phase of the common driving signal while the phase of the first driving signal is not changed with respect to the phase of the common driving signal. Naturally, the phase of the first driving signal may be changed with respect to the phase of the common driving signal while the phase of the second driving signal is not changed with respect to the phase of the common driving signal. In the above explanation, the phase of the second driving signal is switched in the four stages with respect to the phase of the common driving signal. However, the phase of the second driving signal may be switched in multiple stages. Further, the phase of the first driving signal or the second driving signal may be continuously changed with respect to the phase of the common driving signal. In the above explanation, the phase of the first driving signal or the second driving signal is delayed with respect to the phase of the common driving signal. However, the phase of the first driving signal or the second driving signal may be advanced with respect to the phase of the common driving signal.

As explained above, the piezoelectric motor 10 in the second embodiment can be changed to the idling state by changing the phases of the first driving signal and the second driving signal with respect to the phase of the common driving signal while keeping the first driving signal and the second driving signal in the same phase. In this case, as the phase difference between the first and second driving signals and the common driving signal is further reduced, the holding force of the piezoelectric motor 10 for holding the body to be driven can be further increased (see FIGS. 15A to 15D).

Further, if the phase of the second driving signal is brought close to the phase of the common driving signal from the idling state of the piezoelectric motor 10 (the state in which the vibrating body 100 is vibrating but a driving force is not generated), it is possible to apply a driving force in the normal rotation direction according to a degree to which the phase of the second driving signal is brought close to the phase of the common driving signal (see FIGS. 16A to 16D). Conversely, if the phase of the first driving signal is brought close to the phase of the common driving signal, it is possible to apply a driving force in the reverse rotation direction according to a degree to which the first driving signal is brought close to the phase of the common driving signal.

Figure 17:
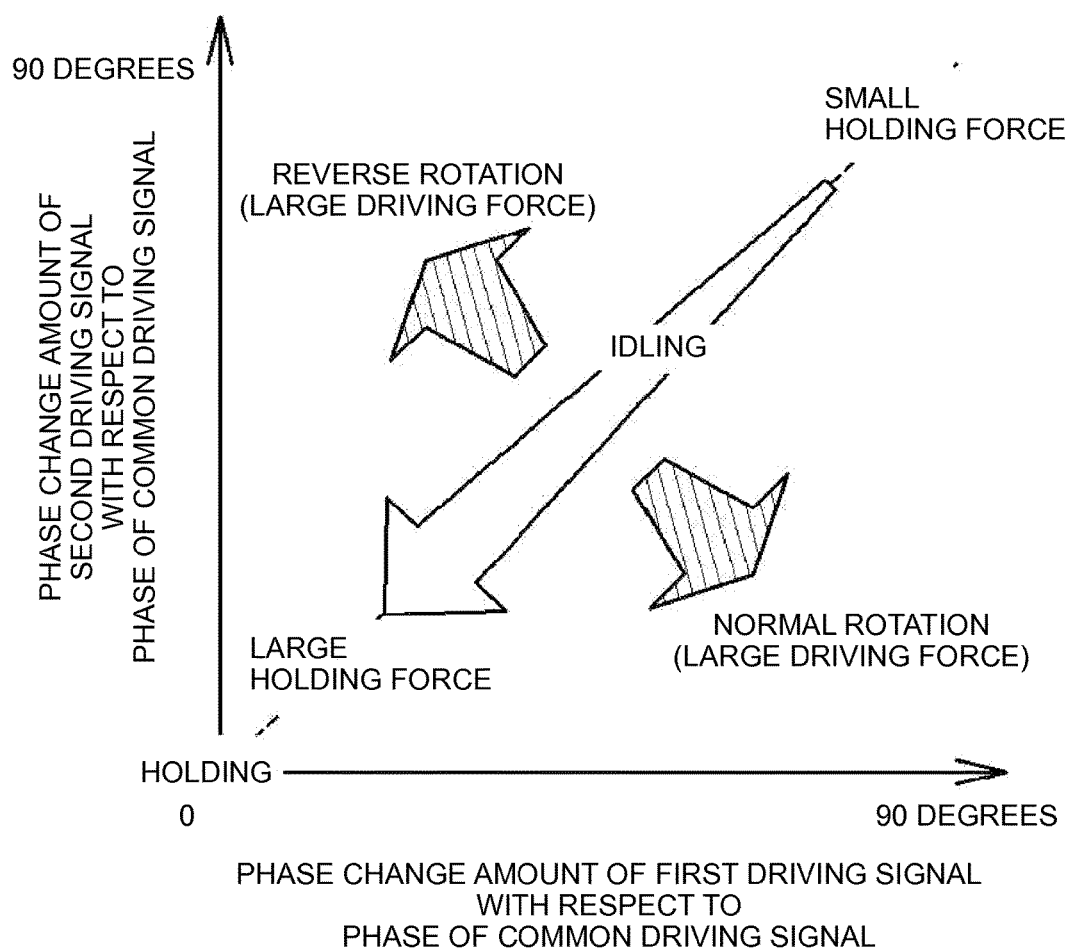
FIG. 17 is an explanatory diagram showing an operation state of the piezoelectric motor in the second embodiment.

FIG. 17 is an explanatory diagram showing an operation state of the piezoelectric motor 10 in the second embodiment corresponding to a combination of a change amount of the phase of the first driving signal with respect to the phase of the common driving signal and a change amount of the phase of the second driving signal with respect to the phase of the common driving signal. Note that the change amount of the phase with respect to the phase of the common driving signal (a phage change amount) may be a phase change amount in a direction for delaying the phase or may be a phase change amount in a direction for advancing the phase.

As shown in the figure, when the phase change amount of the first driving signal and the phase change amount of the second driving signal are set equal, the piezoelectric motor 10 changes to the idling state. In this case, if the phase change amounts of the first driving signal and the second driving signal are increased, a holding force in the idling state can be reduced. Further, irrespective of what kinds of values the phase change amounts of the first driving signal and the second driving signal take, if the phase change amount of the first driving signal or the second driving signal is changed from that state, it is possible to generate a driving force in the normal rotation direction or the reverse rotation direction. For example, if the phase change amount of the second driving signal is reduced (therefore, the phase of the second driving signal is brought close to the phase of the common driving signal), it is possible to apply a driving force in the normal rotation direction. The magnitude of the driving force can be further increased as the phase change amount is further reduced. Moreover, the change of these driving states is realized by changing the phases of the first driving signal and the second driving signal with respect to the phase of the common driving signal. Therefore, it is possible to practically instantaneously change the driving states.

The characteristic of the piezoelectric motor 10 in the second embodiment shown in FIG. 17 is considered to be an innovative characteristic for greatly increasing an application range of piezoelectric motors. Therefore, this point is supplementarily explained. First, in general, as an operation principle of a piezoelectric motor, the projection 102 of the vibrating body 100 is pressed against the body to be driven, an elliptic motion is caused in the projection 102 by causing the bending vibration and the longitudinal vibration in the vibrating body 100, and the body to be driven is driven by a force of friction with the projection 102. Therefore, a driving form of the piezoelectric motor in the past is a form in which the body to be driven is driven by a distance substantially proportional to the number of times the projection 102 of the vibrating body 100 performs the elliptic motion. Therefore, in principle, control in driving the body to be driven using the piezoelectric motor in the past is position control for controlling a driving amount of the body to be driven. In other words, force control for controlling a driving force for the body to be driven is extremely difficult. For example, in a state in which the piezoelectric motor is driving the body to be driven with a small force, when the piezoelectric motor receives reaction larger than the driving force from the body to be driven, the projection of the piezoelectric motor slips. It is difficult to realize control for preventing a large force from being applied to the body to be driven.

On the other hand, the piezoelectric motor 10 in the second embodiment can be changed to the idling state. The holding force in the idling state can be easily increased and decreased. Further, a driving force can be slightly generated from the idling state. The driving force can be increased. Therefore, it is possible to easily realize force control for controlling the driving force applied to the body to be driven. Moreover, it is possible to practically instantaneously change the piezoelectric motor to all the driving states. For example, it is possible to easily realize delicate control for smoothly stopping the body to be driven in a target position while driving the body to be driven with a small force. Naturally, it is also possible to perform position control of the body to be driven as in the piezoelectric motor in the past.

In the explanation in the second embodiment, as shown in FIG. 1, the vibrating body 100 including the first electrodes (the electrode 104a and the electrode 104d), the second electrodes (the electrode 104b and the electrode 104c), and the common electrode (the electrode 104g) is driven. Naturally, the second embodiment can also be applied when, as shown in FIG. 10, the vibrating body 100 including the first electrodes (the electrode 104a and the electrode 104d), the second electrodes (the electrode 104b and the electrode 104c), the third electrode (the electrode 104e), and the common electrode (the electrode 104g) is driven.

C. Application Examples

The piezoelectric motor 10 in the first embodiment, the modifications of the first embodiment, or the second embodiment (hereinafter, the piezoelectric motor 10 in this embodiment) can be suitably incorporated in apparatuses explained below.

Figure 18:
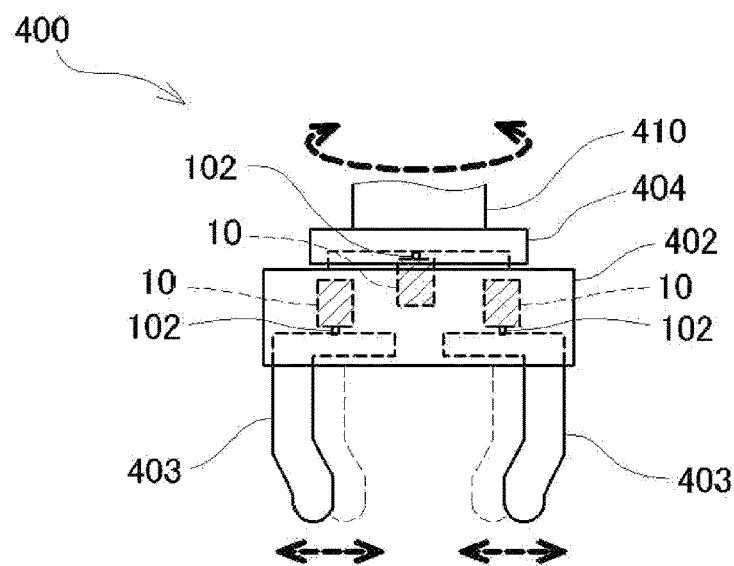
FIG. 18 is an explanatory diagram showing a robot hand incorporating the piezoelectric motor in this embodiment.

FIG. 18 is an explanatory diagram showing a robot hand 400 incorporating the piezoelectric motor 10 in this embodiment. In the robot hand 400 shown in the figure, a plurality of finger sections 403 are erected from a base 402 and connected to an arm 410 via a wrist 404. Base portions of the finger sections 403 are movable in the base 402. The piezoelectric motors 10 are mounted in a state in which the projections 102 are pressed against the base portions of the finger sections 403. Therefore, by causing the piezoelectric motors 10 to operate, it is possible to move the finger sections 403 and grip a target object. The piezoelectric motor 10 is also mounted in the portion of the wrist 404 in a state in which the projection 102 is pressed against an end face of the wrist 404. Therefore, by causing the piezoelectric motor 10 to operate, it is possible to rotate the entire base 402. Note that, in this application example, the finger sections 403 are linearly moving bodies driven by the piezoelectric motors 10. The wrist 404 is a turning body driven by the piezoelectric motor 10.

Figure 19:
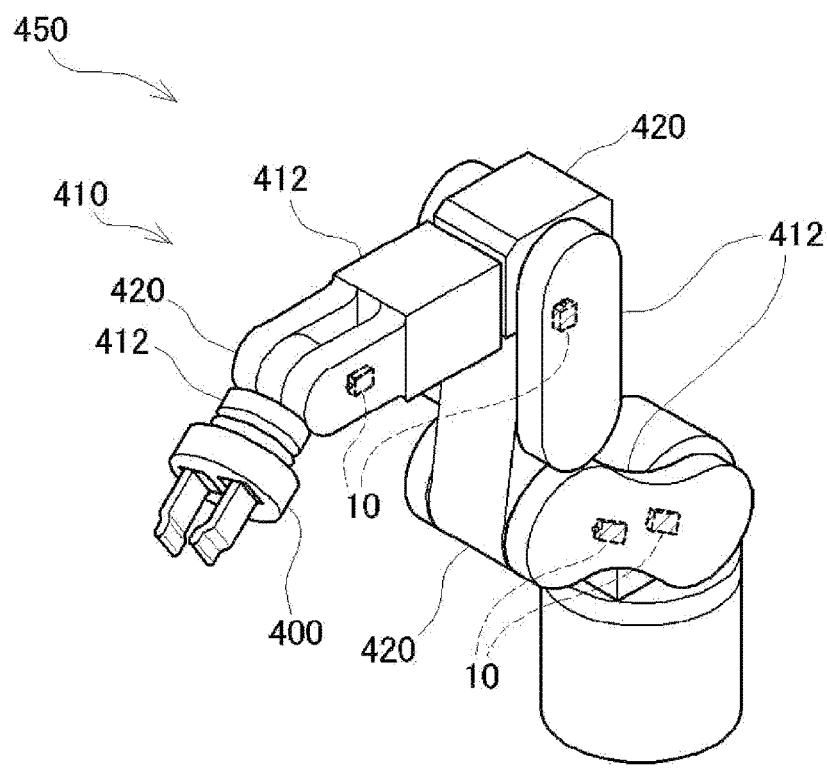
FIG. 19 is an explanatory diagram showing a single-arm robot including the robot hand (a hand section).

FIG. 19 is an explanatory diagram showing a single-arm robot 450 including the robot hand 400 (a hand section). As shown in the figure, the robot 450 includes an arm 410 (an arm section) including a plurality of link sections 412 (link members) and joint sections 420 that connect the link sections 412 in a bendable state. The robot hand 400 is connected to the distal end of the arm 410. The piezoelectric motors 10 are incorporated in the joint sections 420. Therefore, by causing the piezoelectric motors 10 to operate, it is possible to bend the respective joint sections 420 by any angles.

Figure 20:
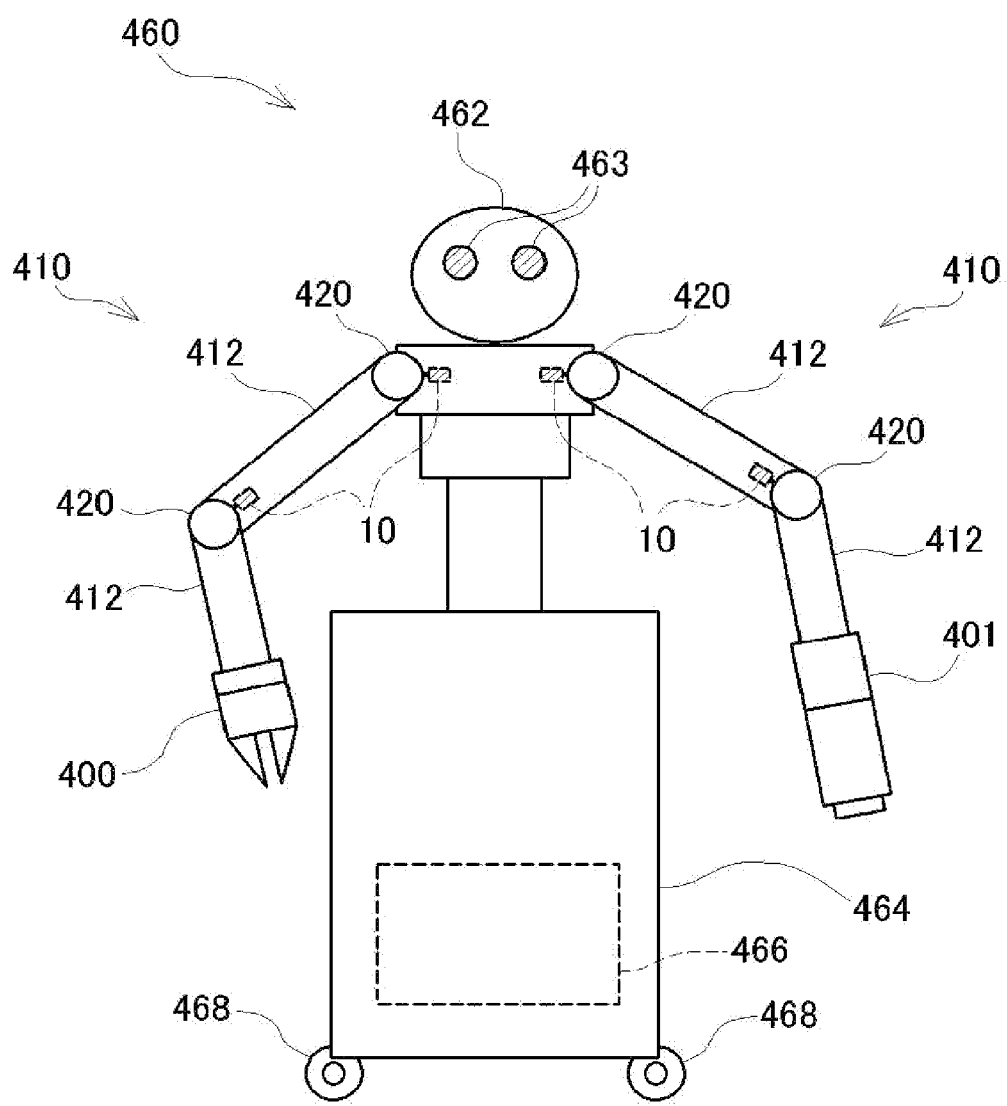
FIG. 20 is an explanatory diagram showing a double-arm robot including the robot hand.

FIG. 20 is an explanatory diagram showing a double-arm robot 460 including the robot hand 400. The robot 460 shown in the figure includes a plurality of (in an example shown in the figure, two) arms 410 including the plurality of link sections 412 and the joint sections 420 that connect the link sections 412 in a bendable state. The robot hand 400 and a tool 401 (an end effector) are connected to the distal ends of the arms 410. A plurality of cameras 463 are mounted on a head 462. A control section 466 that controls the operation of the entire robot 460 is mounted on the inside of a main body section 464. Further, the robot 460 can be carried by casters 468 provided on the bottom surface of the main body section 464. In the robot 460, the piezoelectric motors 10 in this embodiment are also incorporated in the joint sections 420. Therefore, by causing the piezoelectric motors 10 to operate, it is possible to bend the respective joint sections 420 by any angles.

FIGS. 21A to 21C are explanatory diagrams showing a finger assist apparatus 500 incorporating the piezoelectric motor 10 in this embodiment. As shown in the figure, the finger assist apparatus 500 is worn on a human finger (in an example shown in the figure, index finger) and used. In FIG. 21A, a state of the finger assist apparatus 500 viewed from the pad side of the finger is shown. In FIG. 21B, a state of the finger assist apparatus 500 viewed from the side surface side of the finger is shown.

The finger assist apparatus 500 includes a plurality of (in an example shown in the figure, two) driving units 510 connected in series and a fingertip unit 520 connected to the distal end of the finger assist apparatus 500. Note that the two driving units 510 are the same. However, when the two driving units 510 need to be distinguished, as shown in FIG. 1, the two driving units 510 are respectively referred to as driving units 510a and 510b. The driving units 510 corresponds to the "unit" in the aspect of the invention.

As shown in FIG. 21A, the driving unit 510 includes a first member 511 provided on the side of the finger, a second member 512 provided on the opposite side of the finger across the first member 511, a disk-shaped rotor 513 provided between the first member 511 and the second member 512, the vibrating body 100 of the piezoelectric motor 10 that rotates the rotor 513, a first spur gear 514 that rotates together with the rotor 513, a second spur gear 515 that fits with the first spur gear 514, and a coupling screw 516 that couples the first spur gear 514 to the second member 512 of the driving unit 510 adjacent to the driving unit 510. Therefore, the respective driving units 510 can be freely attached and detached by tightening and loosening the coupling screw 516.

The vibrating body 100 is connected to the driving-signal supplying section 110 that supplies the first driving signal, the second driving signal, and the common driving signal (and the third driving signal). Note that the second spur gear 515 in this embodiment corresponds to the "coupling member" in the aspect of the invention.

Attaching sections 502, 504, and 506 for loosely holding the finger from the pad side and the back side of the finger are attached to the first member 511 of the driving unit 510a, the first member 511 of the driving unit 510b, and the fingertip unit 520. In FIG. 21C, a sectional view of the fingertip unit 520 taken along a position of A-A is shown. Therefore, as shown in FIGS. 21A to 21C, the finger assist apparatus 500 can be attached to each finger from the side surface side of the finger by the attaching sections 502, 504, and 506.

Figure 22A:
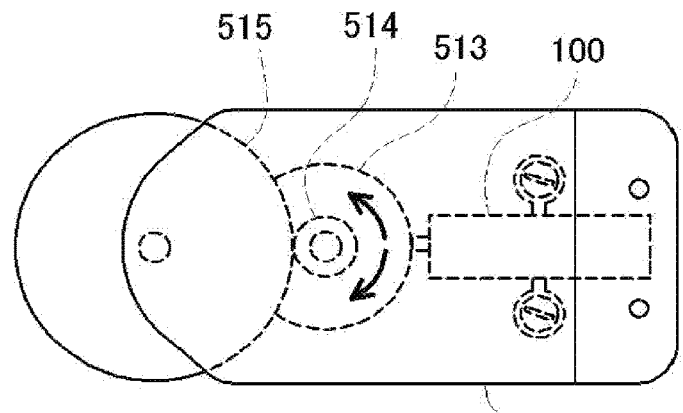
FIGS. 22A to 22C are explanatory diagrams showing the detailed structure of a driving unit.
Figure 22B:
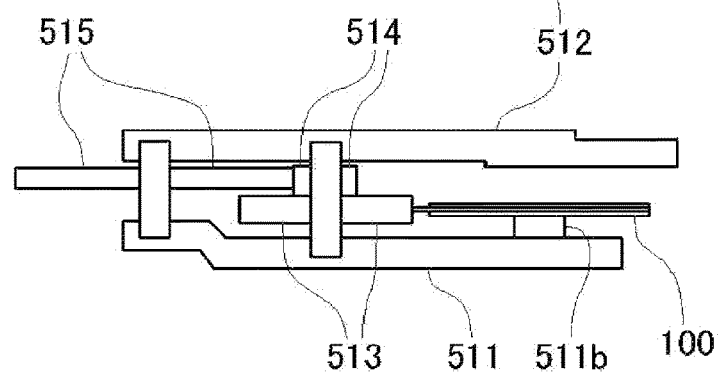
Figure 22C:
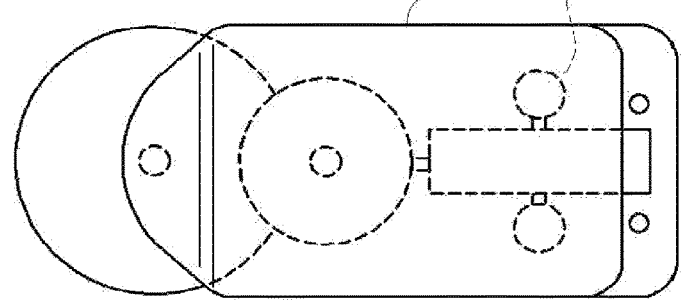

FIGS. 22A to 22C are explanatory diagrams showing the detailed structure of the driving unit 510. Note that, in FIGS. 22A to 22C, the attaching sections 502 and 504 are not shown. FIG. 22A is a front view of the driving unit 510 viewed from the opposite side (the side of the second member 512) of a side worn on the finger. FIG. 22B is a sectional view in the center position of the driving unit 510. FIG. 22C is a rear view of the driving unit 510 viewed from the side worn on the finger (the side of the first member 511).

In the first member 511, columnar bosses 511b are protrudingly provided in two places. The vibrating body 100 is screwed to the top surfaces of the bosses 511b. The disk-shaped rotor 513 is rotatably attached between the first member 511 and the second member 512. The first spur gear 514 is attached coaxially with the rotor 513 and rotates integrally with the rotor 513. Further, the second spur gear 515 is fit with the first spur gear 514. Therefore, when the vibrating body 100 is driven to rotate the rotor 513, the first spur gear 514 rotates together with the rotor 513 and the second spur gear 515 rotates. Note that, in this application example, the rotor 513 corresponds to the "turning body" in the aspect of the invention. The number of teeth of the second spur gear 515 is larger than the number of teeth of the first spur gear 514. Therefore, the rotation of the first spur gear 514 is decelerated (therefore, intensified) and transmitted to the second spur gear 515. If the finger assist apparatus 500 is used, it is possible to assist bending and stretching motions of the human finger using the power of the piezoelectric motor 10.

Figure 23:
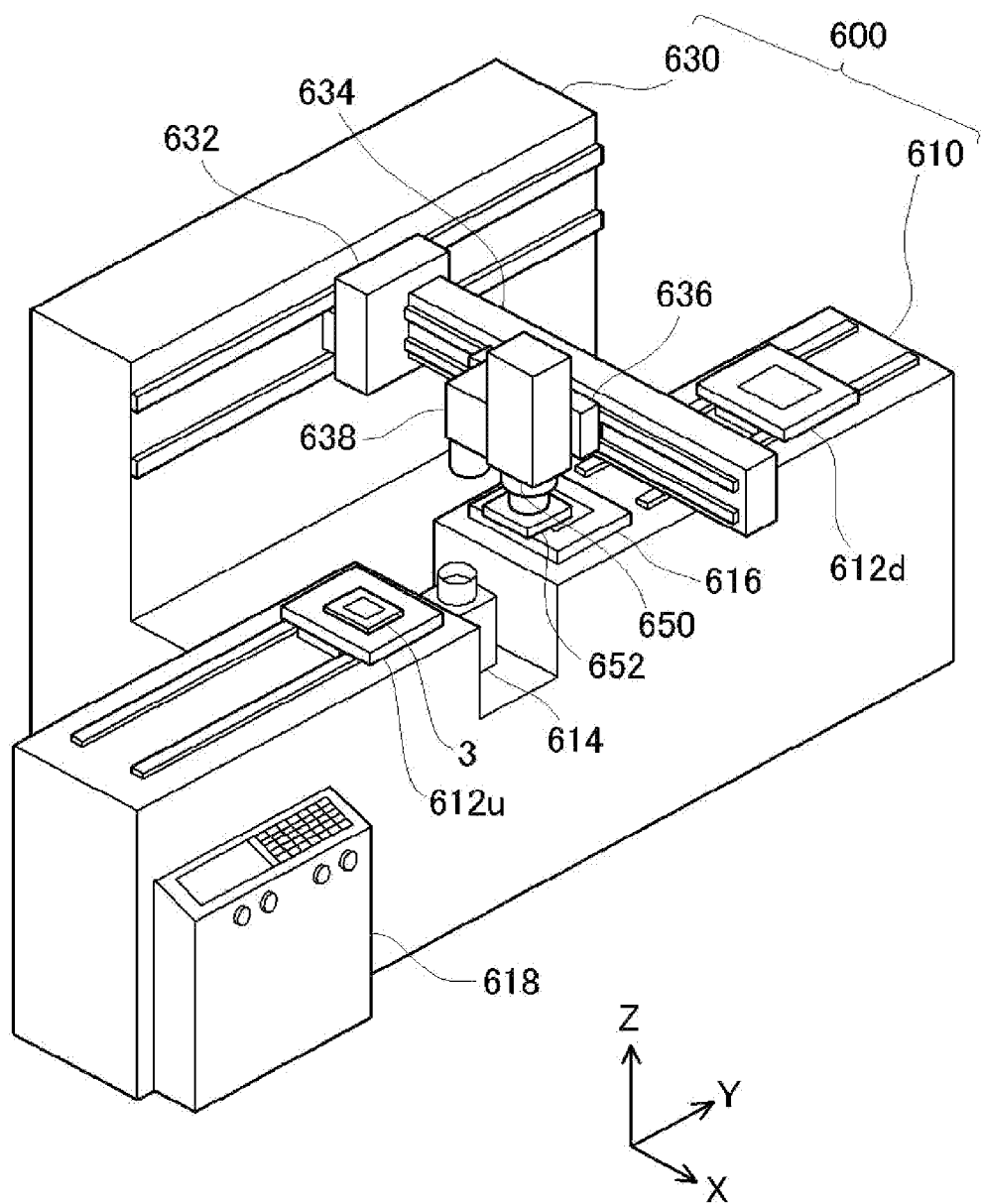
FIG. 23 is a perspective view showing an electronic component inspecting apparatus incorporating the piezoelectric motor in this embodiment.

FIG. 23 is a perspective view showing an electronic component inspecting apparatus 600 incorporating the piezoelectric motor 10 in this embodiment. The electronic component inspecting apparatus 600 shown in the figure roughly includes a base 610 and a supporting table 630 erected on a side surface of the base 610. On the upper surface of the base 610, an upstream side stage 612u on which an inspection target electronic component 3 is placed and conveyed and a downstream side stage 612d on which the inspected electronic component 3 is placed and conveyed are provided. Between the upstream side stage 612u and the downstream side stage 612d, an image pickup device 614 for checking the posture of the electronic component 3 and an inspection table 616 (an inspecting section) on which the electronic component 3 is set to inspect electric characteristics are provided. Note that representative examples of the electronic component 3 include a semiconductor, a semiconductor wafer, display devices such as an LCD and an OLED, a liquid crystal device, various sensors, an inkjet head, and various MEMS devices.

In the supporting table 630, a Y stage 632 is provided to be movable in a direction (a Y direction) parallel to the upstream side stage 612u and the downstream side stage 612d of the base 610. An arm section 634 is extended from the Y stage 632 in a direction (an X direction) toward the base 610. On a side surface of the arm section 634, an X stage 636 is provided to be movable in the X direction. In the X stage 636, an image pickup camera 638 and a gripping device 650 incorporating a Z stage movable in the up down direction (a Z direction) are provided. A gripping section 652 that grips the electronic component 3 is provided at the distal end of the gripping device 650. Further, on the front surface side of the base 610, a control device 618 that controls the operation of the entire electronic component inspecting apparatus 600 is provided. Note that, in this embodiment, the Y stage 632 provided in the supporting table 630, the arm section 634, the X stage 636, and the gripping device 650 correspond to the "electronic component conveying apparatus" in the aspect of the invention.

The electronic component inspecting apparatus 600 having the configuration explained above performs inspection of the electronic component 3 as explained below. First, the inspection target electronic component 3 is placed on the upstream side stage 612u and moved to near the inspection table 616. Subsequently, the electronic component inspecting apparatus 600 moves the Y stage 632 and the X stage 636 to move the gripping device 650 to a position right above the electronic component 3 placed on the upstream side stage 612u. In this case, the electronic component inspecting apparatus 600 can check the position of the electronic component 3 using the image pickup camera 638. The electronic component inspecting apparatus 600 lowers the gripping device 650 using the Z stage incorporated in the gripping apparatus 650. After gripping the electronic component 3 with the gripping section 652, the electronic component inspecting apparatus 600 directly moves the gripping device 650 to above the image pickup device 614. The electronic component inspecting apparatus 600 checks the posture of the electronic component 3 using the image pickup device 614. The electronic component inspecting apparatus 600 adjusts the posture of the electronic component 3 using a fine adjusting mechanism incorporated in the gripping device 650. After moving the gripping device 650 to above the inspection table 616, the electronic component inspecting apparatus 600 moves the Z stage incorporated in the gripping device 650 and sets the electronic component 3 on the inspection table 616. Since the posture of the electronic component 3 is adjusted using the fine adjusting mechanism in the gripping device 650, it is possible to set the electronic component 3 in a correct position of the inspection table 616. After finishing the inspection of the electric characteristics of the electronic component 3 using the inspection table 616, the electronic component inspecting apparatus 600 lifts the electronic component 3 from the inspection table 616. Thereafter, the electronic component inspecting apparatus 600 moves the Y stage 632 and the X stage 636 again, moves the gripping device 650 to over the downstream side stage 612d, and places the electronic component 3 on the downstream side stage 612d. Thereafter, the electronic component inspecting apparatus 600 moves the downstream side stage 612d and conveys the electronic component 3, for which the inspection ends, to a predetermined position.

Figure 24:
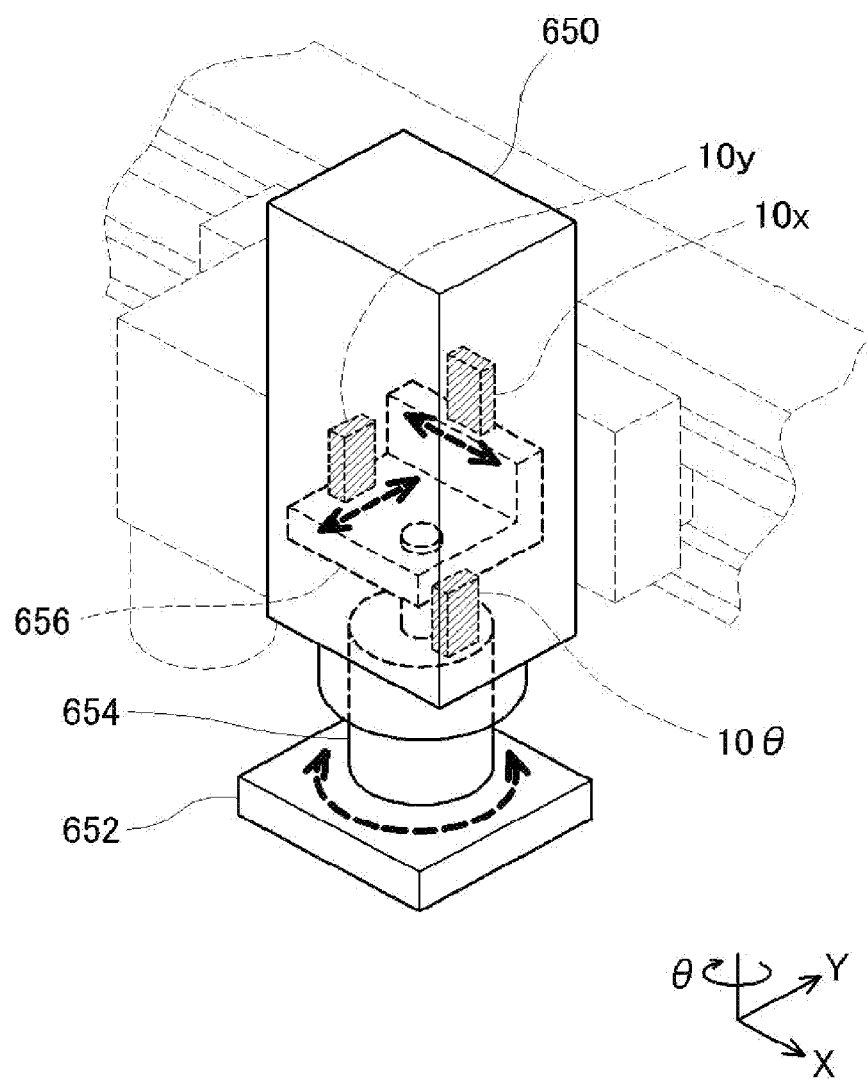
FIG. 24 is an explanatory diagram concerning a fine adjusting mechanism incorporated in a gripping apparatus.

FIG. 24 is an explanatory diagram concerning the fine adjusting mechanism incorporated in the gripping device 650. As shown in the figure, in the gripping device 650, a rotating shaft 654 connected to the gripping section 652, a fine adjustment plate 656 to which the rotating shaft 654 is rotatably attached, and the like are provided. The fine adjustment plate 656 is movable in the X direction and the Y direction while being guided by a not-shown guide mechanism.

As indicated by hatching in FIG. 24, a piezoelectric motor 10θ for a rotating direction is mounted to face an end face of the rotating shaft 654. A projection (not shown in the figure) of the piezoelectric motor 10θ is pressed against the end face of the rotating shaft 654. Therefore, by causing the piezoelectric motor 10θ to operate, it is possible to accurately rotate the rotating shaft 654 (and the gripping section 652) in a θ direction by any angle. A piezoelectric motor 10x for the X direction and a piezoelectric motor 10y for the Y direction are provided to face the fine adjustment plate 656. Projections (not shown in the figure) of the piezoelectric motor 10x and the piezoelectric motor 10y are pressed against the surface of the fine adjustment plate 656. Therefore, by causing the piezoelectric motor 10x to operate, it is possible to accurately move the fine adjustment plate 656 (and the gripping section 652) in the X direction by any distance. Similarly, by causing the piezoelectric motor 10y to operate, it is possible to accurately move the fine adjustment plate 656 (and the gripping section 652) in the Y direction by any distance. Therefore, the electronic component inspecting apparatus 600 shown in FIG. 23 can finely adjust, by causing the piezoelectric motor 10θ, the piezo electric motor 10x, and the piezoelectric motor 10y to operate, the posture of the electronic component 3 gripped by the gripping section 652. Note that, in this application example, the rotating shaft 654 corresponds to the "turning body" in the aspect of the invention and the fine adjustment plate 656 corresponds to the "linearly moving body" in the aspect of the invention.

Figure 25A:
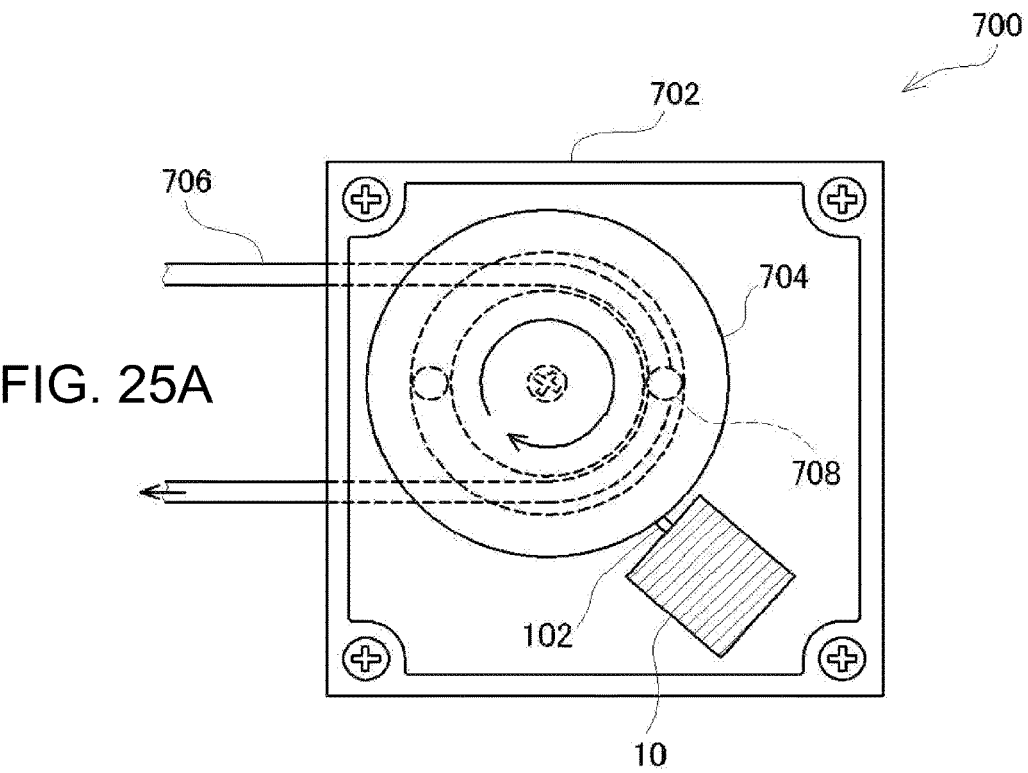
FIGS. 25A and 25B are explanatory diagrams showing a liquid feeding pump incorporating the piezoelectric motor in this embodiment.
Figure 25B:
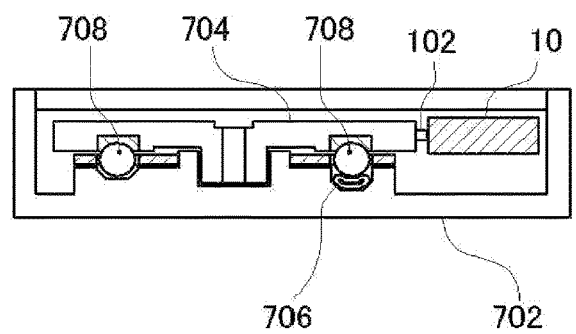

FIGS. 25A and 25B are explanatory diagrams showing a liquid feeding pump 700 incorporating the piezoelectric motor 10 in this embodiment. In FIG. 25A, a plan view of the liquid feeding pump 700 in top view is shown. In FIG. 25B, a sectional view of the liquid feeding pump 700 in side view is shown. As shown in the figures, in the liquid feeding pump 700, a disk-shaped rotor 704 (a moving section) is rotatably provided in a rectangular case 702. A tube 706 (a liquid tube), through which liquid such as a drug solution circulates, is held between the case 702 and the rotor 704. A part of the tube 706 is crushed and closed by a ball 708 (a closing section) provided in the rotor 704. Therefore, when the rotor 704 rotates, since a crushing position of the tube 706 by the ball 708 moves, the liquid in the tube 706 is fed. If the projection 102 of the piezoelectric motor 10 in this embodiment is provided to be pressed against the side surface of the rotor 704, it is possible to drive the rotor 704. Consequently, it is possible to accurately feed an extremely small amount of the liquid. Moreover, it is possible to realize the liquid feeding pump 700 small in size. Note that, in this application example, the rotor 704 corresponds to the "rotating body" in the aspect of the invention.

Figure 26:
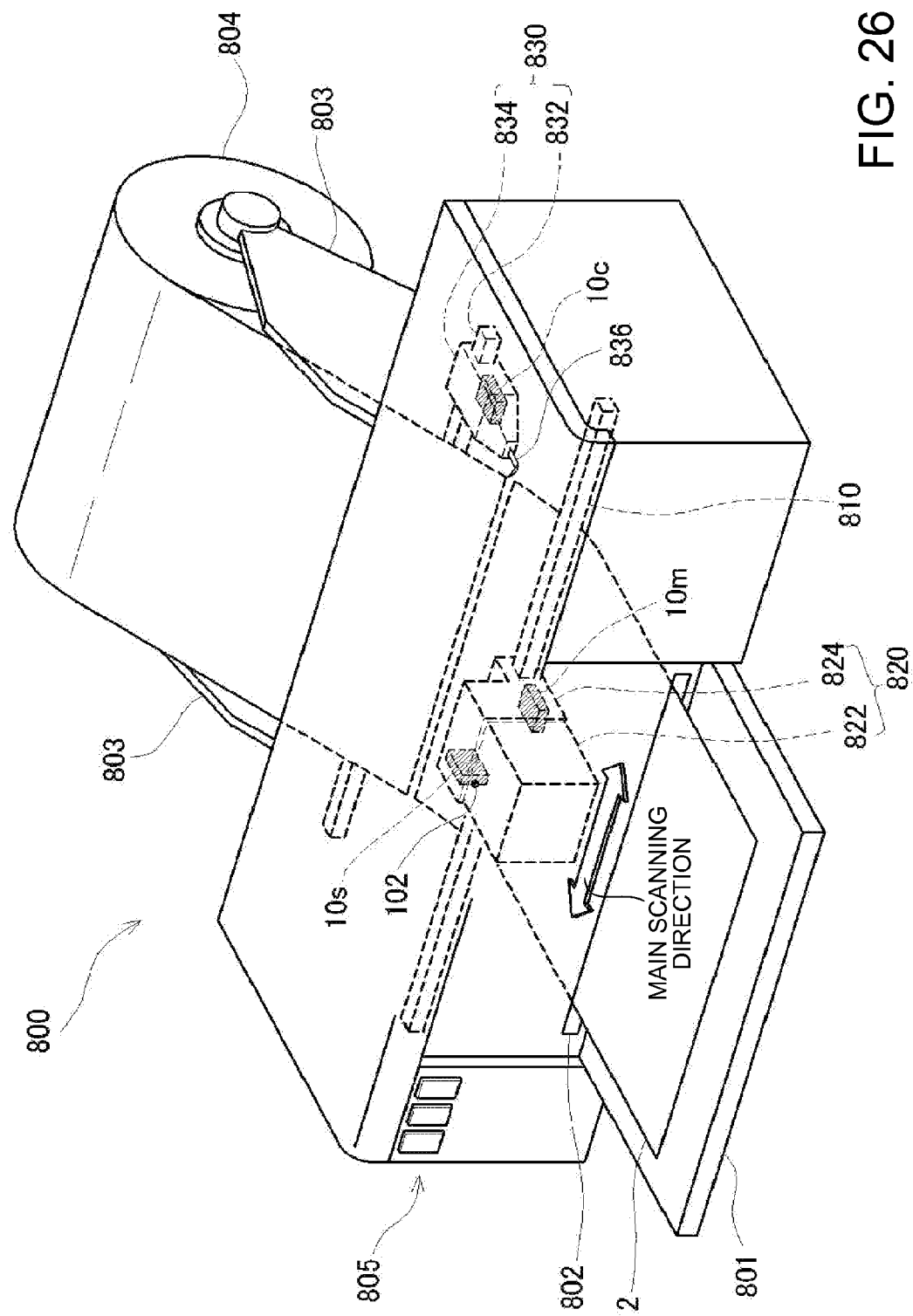
FIG. 26 is a perspective view showing a printing apparatus incorporating the piezoelectric motor in this embodiment.

FIG. 26 is a perspective view showing a printing apparatus 800 incorporating the piezoelectric motor 10 in this embodiment. The printing apparatus 800 shown in the figure is a so-called inkjet printer that jets ink onto the surface of a printing medium 2 and prints an image. The printing apparatus 800 is formed in a substantially box-like external shape. A paper discharge tray 801, a discharge port 802, and a plurality of operation buttons 805 are provided substantially in the center of the front surface. On the rear surface side, a sheet holder 803, in which the printing medium 2 (roll paper 804) wound in a roll shape is set, is provided. When the roll paper 804 is set in the sheet holder 803 and the operation buttons 805 are operated, the roll paper 804 set in the sheet holder 803 is drawn into the printing apparatus 800 and an image is printed on the surface of the printing medium 2 on the inside of the printing apparatus 800. After being cut by a hereinafter-described cutting mechanism 830 mounted on the inside of the printing apparatus 800, the roll paper 804 is discharged from the discharge port 802.

On the inside of the printing apparatus 800, a printing head 820 that reciprocatingly moves in a main scanning direction on the printing medium 2 and a guide rail 810 that guides the movement in the main scanning direction of the printing head 820 are provided. The printing head 820 shown in the figure includes a printing section 822 that jets the ink onto the printing medium 2 and a scanning section 824 for scanning the printing head 820 in the main scanning direction. A plurality of jet nozzles are provided on the bottom surface side (a side facing the printing medium 2) of the printing section 822. The ink can be jet from the jet nozzle toward the printing medium 2. Piezoelectric motors 10m and 10s are mounted on the scanning section 824. A projection (not shown in the figure) of the piezoelectric motor 10m is pressed against the guide rail 810. Therefore, by causing the piezoelectric motor 10m to operate, it is possible to move the printing head 820 in the main scanning direction. The projection 102 of the piezoelectric motor 10s is pressed against the printing section 822. Therefore, by causing the piezoelectric motor 10s to operate, it is possible to bring the bottom surface side of the printing section 822 close to and away from the printing medium 2. In the printing apparatus 800, the cutting mechanism 830 for cutting the roll paper 804 is also mounted. The cutting mechanism 830 includes a cutter holder 834, at the distal end of which a sheet cutter 836 is mounted, and a guide shaft 832 extended in the main scanning direction piercing through the cutter holder 834. A piezoelectric motor 10c is mounted in the cutter holder 834. A not-shown projection of the piezoelectric motor 10c is pressed against the guide shaft 832. Therefore, when the piezoelectric motor 10c is caused to operate, the cutter holder 834 moves in the main scanning direction along the guide shaft 832. The sheet cutter 836 cuts the roll paper 804. It is also possible to use the piezoelectric motor 10 to feed the printing medium 2. Note that, in this application example, the guide rail 810, the guide shaft 832, and the printing section 822 correspond to the "linearly moving body" in the aspect of the invention.

Figure 27:
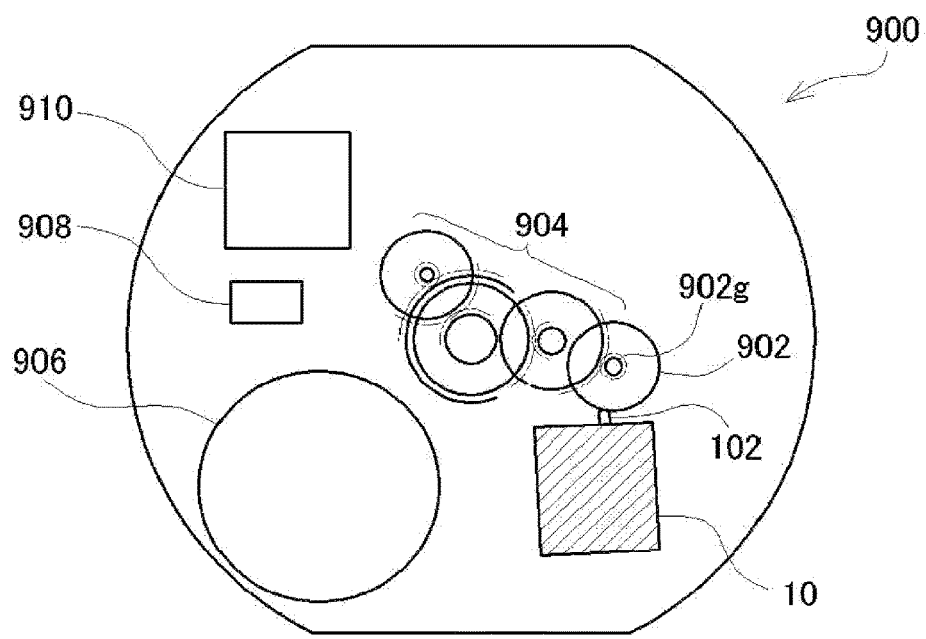
FIG. 27 is an explanatory diagram showing the internal structure of an electronic timepiece incorporating the piezoelectric motor in this embodiment.

FIG. 27 is an explanatory diagram showing the internal structure of an electronic timepiece 900 incorporating the piezoelectric motor 10 in this embodiment. In FIG. 27, a plan view of the electronic timepiece 900 viewed from the opposite side (a case back side) of a time display side is shown. The electronic timepiece 900 illustrated in FIG. 27 includes a disk-shaped rotating disk 902, a gear train 904 that transmits the rotation of the rotating disk 902 to a pointer (not shown in the figure) for indicating time, the piezoelectric motor 10 for driving the rotating disk 902, a power supplying section 906, a crystal chip 908, and an IC 910. The power supplying section 906, the crystal chip 908, and the IC 910 are mounted on a not-shown circuit board. The gear train 904 includes a plurality of gears and a not-shown ratchet. Note that, to prevent complication of illustration, in FIG. 27, a line connecting tooth tips of the gear is represented by a thin alternating long and short dash line and a line connecting tooth roots of the gear is represented by a thick solid line. Therefore, a double circle formed by the thick solid line and the thin alternate long and short dash line represents the gear. The thin alternate long and short dash line indicating the tooth tips is not entirely shown. Only the thin alternate long and short dash line around a portion meshing with another gear is shown.

A small gear 902g is coaxially provided in the rotating disk 902. The gear 902g is meshed with the gear train 904. Therefore, the rotation of the rotating disk 902 is transmitted to the gear train 904 while being decelerated at a predetermined ratio. The rotation of the gear is transmitted to the pointer for indicating time and the time is displayed. If the projection 102 of the piezoelectric motor 10 in this embodiment is provided while being pressed against the side surface of the rotating disk 902, it is possible to rotate the rotating disk 902. Note that, in this application example, the rotating disk 902 corresponds to the "rotating body" in the aspect of the invention.

Figure 28:
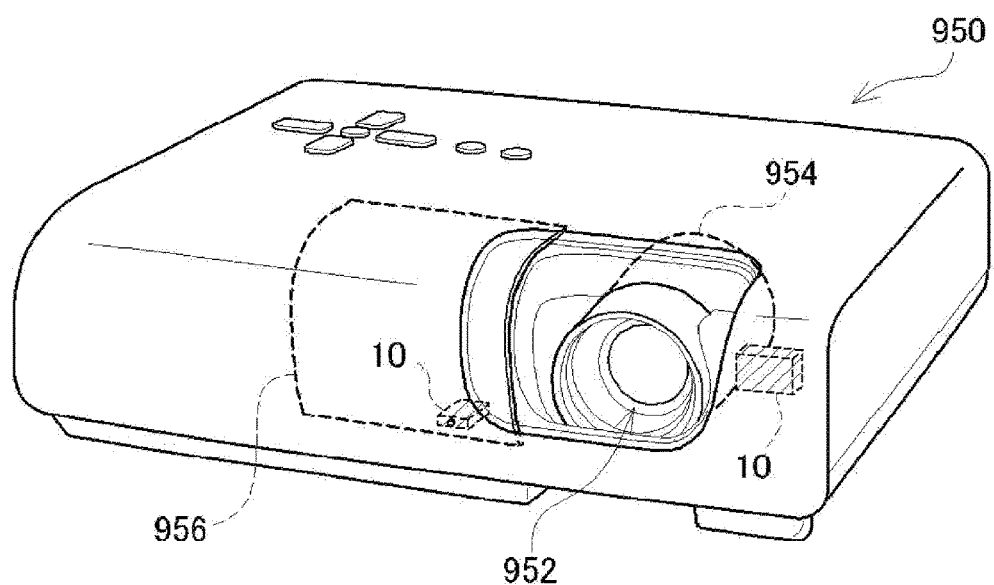
FIG. 28 is an explanatory diagram showing a projection apparatus incorporating the piezoelectric motor in this embodiment.

FIG. 28 is an explanatory diagram showing a projection apparatus 950 incorporating the piezoelectric motor 10 in this embodiment. As shown in the figure, the projection apparatus 950 includes a projecting section 952 including an optical lens. The projection apparatus 950 displays an image by projecting light from a light source (not shown in the figure) incorporated therein. An adjusting mechanism 954 (an adjusting section) for focusing the optical lens included in the projecting section 952 may be driven using the piezoelectric motor 10 in this embodiment. If the piezoelectric motor 10 in this embodiment is used, it is possible to perform delicate focusing. By covering the optical lens of the projecting section 952 with a lens cover 956 while the light from the light source is not projected, it is possible to prevent the optical lens from being scratched. It is possible to use the piezoelectric motor 10 in this embodiment to open and close the lens cover 956. Note that, in this application example, the adjusting mechanism 954 and the lens cover 956 correspond to the "linearly moving body" in the aspect of the invention.

The piezoelectric motor 10 in this embodiment is explained above. However, the invention is not limited to the embodiments, the modifications, and the application examples and can be carried out in various forms without departing from the spirit of the invention.

The entire disclosure of Japanese Patent Application No. 2013-225048, filed Oct. 30, 2013 is expressly incorporated by reference herein.

What is claimed is:
1. A piezoelectric motor comprising:
   a vibrating body including a piezoelectric material;
   a common electrode arranged on one surface of the vibrating body;
   a first electrode and a second electrode arranged on a surface different from the surface on which the common electrode is arranged; and
   a driving-signal supplying section configured to supply a common driving signal to the common electrode, supply a first driving signal to the first electrode, and supply a second driving signal to the second electrode, wherein
   the driving-signal supplying section is capable of supplying the first driving signal with a phase varied from a phase of the common driving signal and supplying the second driving signal with a phase varied from the phase of the common driving signal.

2. The piezoelectric motor according to claim 1, wherein the first electrode and the second electrode are arranged on a surface on an opposite side of the surface on which the common electrode is arranged.

3. The piezoelectric motor according to claim 1, wherein a waveform of the first driving signal and a waveform of the second driving signal are same as a waveform of the common driving signal.

4. The piezoelectric motor according to claim 1, wherein the driving-signal supplying section is capable of supplying the common driving signal, the first driving signal, and the second driving signal in a same phase.

5. The piezoelectric motor according to claim 1, wherein the first electrode is connected to a first low-pass filter circuit, and
   the second electrode is connected to a second low-pass filter circuit.

6. The piezoelectric motor according to claim 1, wherein the first the driving-signal supplying section is capable of supplying the first driving signal and the second driving signal having phases different from the phase of the common driving signal but having a same phase each other.

7. The piezoelectric motor according to claim 1, wherein the driving-signal supplying section is capable of changing the phase of the first driving signal with respect to the phase of the common driving signal and capable of changing the phase of the second driving signal with respect to the phase of the common driving signal.

8. The piezoelectric motor according to claim 1, wherein a third electrode is provided on a surface on an opposite side of the surface on which the common electrode is arranged, and the driving-signal supplying section is capable of supplying a third driving signal having a phase different from the phase of the common driving signal.

9. The piezoelectric motor according to claim 1, wherein the body to be driven is a turning body.

10. The piezoelectric motor according to claim 1, wherein the body to be driven is a linearly moving body.

11. A robot comprising:
an arm section provided with a turnable joint section;
a hand section provided in the arm section; and
a main body section provided with the arm section,
the robot including a piezoelectric motor provided in the joint section and configured to bend or drive to rotate the joint section, wherein
the piezoelectric motor includes:
a vibrating body including a piezoelectric material;
a common electrode arranged on one surface of the vibrating body;
a first electrode and a second electrode arranged on a surface different from the surface on which the common electrode is arranged; and
a driving-signal supplying section configured to supply a common driving signal to the common electrode, supply a first driving signal to the first electrode, and supply a second driving signal to the second electrode, and
the driving-signal supplying section is capable of supplying the first driving signal with a phase varied from a phase of the common driving signal and supplying the second driving signal with a phase varied from the phase of the common driving signal.

12. A piezoelectric motor comprising a vibrating body provided with a common electrode, a first electrode, and a second electrode and configured to perform bending vibration, wherein
the piezoelectric motor is capable of supplying a driving signal having a phase different from a phase of the common electrode to the first electrode and supplying a driving signal having a phase different from the phase of the common electrode to the second electrode.

* * * * *